US008440136B2

(12) United States Patent
Jönson et al.

(10) Patent No.: US 8,440,136 B2
(45) Date of Patent: May 14, 2013

(54) STEEL ALLOY AND TOOLS OR COMPONENTS MANUFACTURED OUT OF THE STEEL ALLOY

(75) Inventors: Lennart Jönson, Karlstad (SE); Odd Sandberg, Uddeholm (SE)

(73) Assignee: Uddeholms AB, Hagfors (SE)

( * ) Notice: Subject to any disclaimer, the term of this patent is extended or adjusted under 35 U.S.C. 154(b) by 0 days.

(21) Appl. No.: 13/211,630

(22) Filed: Aug. 17, 2011

(65) Prior Publication Data

US 2011/0297277 A1 Dec. 8, 2011

Related U.S. Application Data

(63) Continuation of application No. 12/064,195, filed on Feb. 19, 2008, now Pat. No. 8,025,839.

(30) Foreign Application Priority Data

Aug. 24, 2005 (SE) ....................................... 0501876

(51) Int. Cl.

| | |
|---|---|
| ***C22C 38/48*** | (2006.01) |
| ***C22C 38/46*** | (2006.01) |
| ***C22C 38/50*** | (2006.01) |
| ***C22C 38/06*** | (2006.01) |
| ***C22C 38/56*** | (2006.01) |
| ***C22C 38/58*** | (2006.01) |
| ***C22C 38/44*** | (2006.01) |
| *C22C 38/52* | (2006.01) |
| *B21D 45/28* | (2006.01) |
| *B29C 45/00* | (2006.01) |
| *B29C 47/00* | (2006.01) |
| *B22F 3/00* | (2006.01) |

(52) U.S. Cl.

USPC ................. 420/12; 420/38; 420/65; 425/542; 425/376.1; 425/78; 72/324; 148/324; 148/325

(58) Field of Classification Search .......... 148/325–327, 148/324; 420/12, 37, 38, 57, 59, 65, 66; 425/542, 78, 376.1; 72/324

See application file for complete search history.

(56) References Cited

U.S. PATENT DOCUMENTS 4,340,432 A 7/1982 Hede
4,929,419 A 5/1990 Wegman et al.

FOREIGN PATENT DOCUMENTS

DE 4231695 A1 3/1994
DE 4447514 2/1996

(Continued)

OTHER PUBLICATIONS

Office Action dated May 8, 2012, in corresponding Canadian Patent Application No. 2,618,596.

(Continued)

*Primary Examiner* — Jessee R. Roe

(74) *Attorney, Agent, or Firm* — Thomas & Karceski, PC

(57) ABSTRACT

The invention relates to a powder metallurgically manufactured steel with a chemical composition containing, in % by weight: 0.01-2 C, 0.6-10 N, 0.01-3.0 Si, 0.01-10.0 Mn, 16-30 Cr, 0.01-5 Ni, 0.01-5.0 (Mo+W/2), 0.01-9 Co, max. 0.5 S and 0.5-14 (V+Nb/2), where the contents of N on the one hand and of (V+Nb/2) on the other hand are balanced in relation to each other such that the contents of these elements are within an area that is defined by the coordinates A', B', G, H, A', where the coordinates of [N, (V+Nb/2)] are: A': [0.6,0.5]; B': [1.6,0.5]; G: [9.8,14.0]; H: [2.6,14.0], and max. 7 of (Ti+Zr+Al), balance essentially only iron and impurities at normal amounts. The steel may be used for tools for injection molding, compression molding and extrusion of components of plastics, and cold working.

40 Claims, 13 Drawing Sheets

FOREIGN PATENT DOCUMENTS

| | | | | |
|---|---|---|---|---|
| EP | 0296439 | A2 | | 12/1988 |
| GB | 1070744 | | * | 6/1967 |
| GB | 1073971 | A | | 6/1967 |
| JP | 2005-530041 | | | 10/2005 |
| TW | 200417614 | | | 9/2004 |
| WO | WO 9519240 | | | 7/1995 |
| WO | WO 97/03215 | | | 1/1997 |
| WO | WO 02/070769 | A1 | | 9/2002 |
| WO | WO 03/069004 | | * | 6/2003 |
| WO | WO 03-069004 | | | 8/2003 |
| WO | WO 03/069009 | | * | 8/2003 |
| WO | WO 03/106728 | | | 12/2003 |
| WO | WO 2005/054531 | A1 | * | 6/2005 |

OTHER PUBLICATIONS

"Powder Metallurgy," a summary obtained from http://www.uddeholm.com/b__2265.htm on Jan. 6, 2011 (undated).

Woo-Il Park, et al., "Fabrication of Ultra High Nitrogen Austenitic Stainless Steel by NH3 Solution Nitriding", ISIJ Int'l, vol. 50, No. 11, pp. 1546-1551 Aug. 17, 2010.

Landbrug et al., "The Perfect Knife Steel for Robots of the Future," obtained at http://danishmeat.eu/DMRI/Forsideelementer/Forsidenyt/New__steel.aspx, printed Jan. 5, 2011.

"Tilt" Brochure, by Kershaw Knives, a subsidiary of KAI USA Ltd., dated Jun. 1, 2010.

"Zero Tolerance Model 0551 Folding Knife", printed Jan. 6, 2010 from "Zero Tolerance" web offering of http://www.tacticaldefender.com (undated).

Kajinic et al., "Microstructure and Mechanical Properties of a new CPM® Corrosion resistant and Wear resistant Tool Steel," 7th Int'l Tooling Conf, May 2-5, 2006, pp. 283-290.

Kajinic et al., "Corrosion and Wear Resistance of PM Martensitic Stainless Tool Steels for use in Food Processing . . . ," 8th Int'l Tooling Conf, Jun. 2-4, 2009, pp. 201-212.

Sandberg et al., "Martensitic Nitrogen Alloyed Steels with Excellent Corrosion and Wear Resistance," Stainless Steel World America 2010 Conf, Houston, pp. AS-2-AS-18 (2010).

Office Action for Taiwanese Patent Application Serial No. 096103501, dated Mar. 25, 2011.

International Search Report for PCT/SE2006/050294, mailed Dec. 12, 2006.

Rejection Notice mailed on Oct. 16, 2012, in corresponding Japanese Patent Application No. 2008-527879.

Maruyama et al., (Uddeholm KK), "Bohler M340—A New Development, Nitrogen Alloyed Tool Steel . . . ", Conf. on Die and Mould Tech., Jun. 11, 2011, vol. 2000, p. 152-153.

Extended European Search Report mailed Feb. 6, 2013, in corresponding European Patent Application No. 06769672.4.

* cited by examiner

STEEL ALLOY AND TOOLS OR COMPONENTS MANUFACTURED OUT OF THE STEEL ALLOY

CROSS-REFERENCE TO RELATED APPLICATION(S)

This is a Continuation Patent Application of U.S. patent application Ser. No. 12/064,195, filed on Feb. 19, 2008, now U.S. Pat. No. 8,025,839. This patent application also relies for priority on International Patent Application No. PCT/SE2006/050294, filed on 24 Aug. 2006, and Swedish Patent Application Serial No. 0501876-7, filed on Aug. 25, 2005. The contents of all three patent applications are incorporated herein by reference.

FIELD OF THE INVENTION

The invention relates to a powder metallurgically manufactured steel alloy intended to be used primarily for the manufacturing of tools for injection moulding, compression moulding and extrusion of plastic components, but also for tools exposed to corrosion in cold-working such as forming dies. Another field of application is injection moulding or plastic/metal powder—MIM—that requires a low friction and a good corrosion resistance. The invention also relates to tools manufactured out of the present steel alloy, particularly tools for the forming of plastics, and tools for the forming and cutting of sheets in cold-working applications, as well as tools for the pressing of powder. In addition, the invention also relates to construction components such as injection nozzles for engines, wear parts, pump parts, bearing components etc. Yet another field of application is the use of the steel alloy for the manufacturing of knives for food industry.

DESCRIPTION OF RELATED ART

In connection with injection moulding, compression moulding and extrusion of plastic components, the tool is exposed to corrosive media originating from the components of the plastic, but also from the release and lubricating agents that are applied onto the tool surface in order to decrease the friction between the plastic and the forming tool. Cooling ducts with water and its normal content of chloride ions are known to result in corrosion damages in forming tools for plastic. Often, the tools have a complex shape with cavities. Even when a tool is taken out of operation, the liquid remaining in these cavities can result in local attacks of corrosion if the material does not have the requisite corrosion-resistance. Galling and fretting are other fields of problems that result in increased maintenance and decreased production.

Galling and adhesive wear is caused by micro-welding between tool parts when exposed to a high contact pressure that leads to metal fragments getting stuck on the tool parts and thus increasing friction. Eventually, shearing occurs between the parts, which results in complete renovation or exchange of these.

Fretting or fretting corrosion takes place between parts that are exposed to vibrations or cyclic movements in connection with the forming cycle. Discoloration of the form parts due to corrosion products will result in impaired functionality and also to discoloration of the plastic products. In order to avoid these problems the tool parts must be polished, which means that in time they will lose tolerance and new tool parts must be acquired.

A known tool material that is manufactured by the applicant and that is used in the present technical field is the melt metallurgically manufactured forming steel for plastics that is known under the trade name Stavax ESR®, having the nominal composition 0.38 C, 1.0 Si, 0.4 Mn, 13.6 Cr, 0.30 V, 0.02 N, balance iron and normal impurities. This steel has a good corrosion resistance and a very good finishing quality.

Yet another known tool material that is manufactured by the applicant and that is used in the present technical field is the melt metallurgically manufactured forming steel for plastics that is known under the trade name Stavax Supreme®, having the nominal composition 0.25 C, 0.35 Si, 0.55 Mn, 13.3 Cr, 0.35 Mo, 0.35 V, 0.12 N, balance iron and normal impurities. This steel has a carbide content of about 0.5% by volume and has a very good corrosion resistance and a very good finishing quality.

Another known tool material that is manufactured by the applicant and that is used in the present technical field is the melt metallurgically manufactured forming steel for plastics that is known under the trade name ELMAX®, having the nominal composition 1.7 C, 0.8 Si, 0.3 Mn, 18.0 Cr, 1.0 Mo, 3.0 V, balance iron and normal impurities. This steel has a good corrosion resistance and the wear resistance is good too, but it is desirable to further improve the properties. Depending on heat treatment, the steel normally has a highest hardness of 57-59 HRC in the hardened and tempered condition, which under certain conditions may be too low, resulting in impression damages when the tool is used, e.g. due to fragments of plastic that may be released when opening the tool and ending up between the tool halves when these are pressed against each other in the next forming operation.

Cold-working often comprises cutting, punching, deep drawing and other types of forming of metallic work pieces, usually in the form of sheets and normally at room temperature. Cold-working tools are used for this type of operations, on which tools a number of demands are put, which are difficult to combine. The tool material should have a good resistance against abrasive wear, an adequate hardness, and for some applications it should also have a good resistance against adhesive wear and also an adequate toughness in its working condition.

Sverker 21® is a conventionally manufactured steel with the composition 1.55 C, 0.3 Si, 0.3 Mn, 11.8 Cr, 0.8 Mo, 0.8 V, balance iron and impurities at normal contents, which steel has been widely used for cold-working and other applications.

The above mentioned steel, and other steels on the market, fulfill high demands on abrasive wear resistance and toughness. They do however not fulfill very high demands on adhesive wear resistance, which is often a dominating problem in different types of cold-forming tool applications, such as sheet pressing, pipe bending and cold forging of e.g. martensitic or ferritic steels, sheets of austenitic and ferritic stainless steels, copper, brass, aluminum etc. Such problems can be decreased by lubricating and/or coating, for example by PVD or CVD techniques, of the tool surfaces by friction-lowering ceramic layers of e.g. TiN, by surface nitration or by coating with hard chromium, but such solutions are expensive and time-consuming. Moreover, there is a major risk of damages on and/or flaking of the layers. Reparation becomes very complicated if abrasive or adhesive wear damages occur, as the damage is always on a part of the tool having a high strain. Abrasive and adhesive wear also occurs between different tool components.

In addition to the above mentioned properties, the tools should have very good corrosion resistance, high hardness, good wear resistance, good grindability, good machinability and high finishing quality, good dimensional stability, high compression strength, good ductility, good fatigue strength properties and high purity.

By solid phase nitration, powder metallurgically made materials can be given a high content of nitrogen, whereby they achieve a built-in nitrided layer. One example of such a material is the applicant's own steel that is marketed under the name VANCRON 40®, which is comprised inter alia in Swedish patent no. SE 514,410, having the following ranges of composition, in % by weight, 1-2.5 C, 1-3.5 N, 0.05-1.7 Mn, 0.05-1.2 Si, 3-6 Cr, 2-5 Mo, 0.5-5 W, 6.2-17 (V+2Nb), balance iron and unavoidable impurities at normal contents.

It is known from the article "Influence of nitrogen alloying on galling properties of PM tool steels", 6th International Tooling Conference, Karlstad Universitet 2002, that nitrogen, by together with carbon combining with vanadium in order to form M(C, N) carbonitrides and $M_6C$ catrbides, has a positive effect on the anti galling properties of a tool steel.

SUMMARY OF THE INVENTION

The object of the invention is to address the above mentioned problems in order to provide a steel intended primarily for the manufacturing of tools for injection moulding, compression moulding and extrusion of components of plastics. The steel according to the invention is also suitable for tools for the forming of plastics, and tools for the forming and cutting of sheets in cold-working applications, tools for the pressing of powder, construction components such as injection nozzles for engines, wear parts, pump parts, bearing components etc., as well as for knives for use in food industry. The invention also relates to construction components such as injection nozzles for engines, wear parts, pump parts, bearing components etc. Yet another field of application is knives for food industry. For the above mentioned purposes it is desirable that the steel has a very good corrosion resistance at the same time as the steel should have a very good resistance to mixed adhesive and abrasive wear, particularly a good resistance to galling and fretting, and have a high hardness. In addition to the above mentioned properties that are very important, the steel alloy should also fulfill one or some of the following properties:

Good resistance to pit corrosion in spark machining,

High compression strength in the hardened and tempered condition,

Good ductility/toughness,

Good fatigue strength properties,

High purity,

Good heat treatment properties in the range 950-1150° C.,

Good hardenability; should allow for hardening and tempering to a hardness of between 45-62 HRC, to be used in sheets, strips or rods from about 0.5 mm and up to rod dimensions of Ø500 mm and 400×600 mm, Good dimensional stability in heat treatment and also during long term use of the tool that is manufactured out of the steel, Should be able to be used in uncoated condition, Should allow for surface coating by PVD/CVD/nitration, Adequate thermal conductivity, and Good finishing quality.

The above mentioned primary objects and one or some of the other purposes according to the above list can be achieved by the steel alloy having a chemical composition in which the contents are given as % by weight, and by the tool manufactured out of the steel alloy having been heat treated in the manner specified in the appended claims.

The steel material according to the invention is powder metallurgically manufactured, which is a prerequisite for the steel to be highly free from oxide inclusions. The powder metallurgical manufacturing preferably comprises gas atomizing of a steel melt, with nitrogen as atomizing gas, which will give the steel alloy a certain minimum content of nitrogen, solid phase nitration of the powder followed by consolidation by hot isostatic pressing. The steel can be used in this condition or after forging/rolling to final dimensions.

For the alloying elements comprised in the steel, the following should apply.

Carbon should primarily exist in the steel according to the invention at a content that is adequate for it, together with nitrogen in solid solution in the matrix of the steel, to contribute to giving the steel, in its hardened and tempered condition, a high hardness, up to 60-62 HRC. Carbon can also be included, together with nitrogen, in primary precipitated $M_2X$ nitrides, carbides and/or carbonitrides, where M is essentially chromium and X is essentially nitrogen, as well as in primary precipitated MX nitrides, carbides and/or carbonitrides, where M is essentially vanadium and X is essentially nitrogen, and be included in possibly existing $M_{23}C_6$ and/or $M_7C_3$ carbides.

Together with nitrogen, carbon should give the desired hardness and form the comprised hard phases. The content of carbon in the steel, i.e. carbon that is dissolved in the matrix of the steel and carbon that is bound in carbides and/or carbonitrides, should be kept at a level that is as low as can be motivated for production economical reasons and for phase reasons. The steel should be able to be austenitized and be converted to martensite when being hardened. If needed, the material should be subjected to low temperature cooling in order to avoid residual austenite. The carbon content should preferably be at least 0.01%, even more preferred at least 0.05%, and most preferred at least 0.1%. The carbon content could be allowed to be at a maximum of 2%. Tests have shown that the carbon content may preferably be in the interval 0.13-2.0%. Depending on field of application, the carbon content is adapted in relation to the amount of nitrogen in the steel and to the total content of primarily the carbide-forming elements vanadium, molybdenum and chromium in the steel, such that the steel is given a content of $M_2X$ carbides, nitrides and/or carbonitrides of 2-10% by volume, and a content of MX carbides, nitrides and/or carbonitrides of 5-40% by volume. $M_{23}C_6$ and/or $M_7C_3$ carbides can also exist at contents of up to 8-10% by weight, primarily in conjunction with very high contents of chromium. The total content of MX, $M_2X$ and $M_{23}C_6/M_7C_3$ carbides, nitrides and/or carbonitrides in the steel should however not exceed 50% by volume. In addition to this, the existence of other carbides in the steel should be minimized such that the content of chromium that is dissolved in the austenite does not get below 12%, preferably is at least 13%, and even more preferred at least 16%, which guarantees that the steel achieves a good corrosion resistance.

Nitrogen is an essential alloying element in the steel according to the invention. Similarly to carbon, nitrogen should be comprised in a solid solution in the matrix of the steel in order to give the steel an adequate hardness and in order to form the desired hard phases. Nitrogen is preferably used as an atomizing gas in the powder metallurgical process of manufacturing metal powder. By such manufacturing of powder, the steel will be brought to contain nitrogen at a maximum of about 0.2-0.3%. This metal powder can then be given desired nitrogen content by any known technique such as pressurizing in nitrogen gas or by solid phase nitration of the manufactured powder, which means that the steel preferably contains at least 0.6%, suitably at least 0.8%, and most preferred at least 1.2% nitrogen. By applying pressurizing in nitrogen gas or solid phase nitration, it is of course also possible to let the atomizing take place with some other atomizing gas, such as argon.

In order not to cause brittleness problems and give residual austenite, nitrogen should exist at a maximum of 10%, preferably 8%, and even more preferred a maximum of 6%. By vanadium but also other strong nitride/carbide formers, such as chromium and molybdenum, having a tendency to react with nitrogen and carbon, the carbon content should at the same time be adapted to this high nitrogen content such that the carbon content is maximized to 2%, preferably not more than 1.5%, suitably not more than 1.2% for the above given nitrogen contents. It should however be taken into consideration that corrosion resistance decreases at an increased carbon content and that also the resistance to galling can be decreased primarily due to the possible forming of relatively large chromium carbides, $M_{23}C_6$ and/or $M_7C_3$, which is a drawback, compared to if the steel according to the invention is given a lower carbon content than the above given maximum contents.

In case it is considered to be sufficient for the steel to have lower nitrogen contents, it is accordingly desirable also to lower the carbon content. The carbon content is preferably limited to as low levels as could be motivated for cost reasons, but according to the concept of the invention the carbon content can be varied at a given nitrogen content, whereby the contents of hard phase particles and the hardness of the steel can be adapted depending on the field of application for which the steel is intended. Also nitrogen contributes at the given contents of the corrosion inhibiting alloying elements chromium and molybdenum to promote the formation of MX carbonitrides and to suppress the formation of $M_{23}C_6$ and/or $M_7C_3$ that in an unfavourable manner reduce the corrosion properties of the steel. Examples of steels according to the invention, the compositions of which having been adapted to various property profiles, are shown in Tables 2a-5a further below.

Silicon is comprised as a residual from the manufacturing of the steel and exists at a minimum of 0.01%. At higher contents, silicon will result in solution hardening, but also some brittleness. Silicon is also a strong ferrite former and should accordingly not exist at contents above 3.0%. Preferably, the steel does not contain more than a maximum of 1.0% silicon, suitably not more than 0.8%. A nominal content of silicon is 0.3%.

Manganese contributes to give the steel a good hardenability. Hardenability is an important property of the steel, in particular for the first preferred embodiment of the steel, in which the steel should be used for the manufacturing of tools for injection moulding, compression moulding and extrusion of plastic components, as well as for moulding tools for plastics, which tools may be of course dimensions. In order to avoid brittleness problems, manganese should not be present at contents above 10.0%. Preferably, the steel does not contain more than a maximum of 5.0% manganese, suitably not more than 2.0% manganese. In other embodiments in which hardenability is not of the same importance, manganese exists at low contents in the steel as a residual from the manufacturing of the steel, and by forming manganese sulphide it binds the amounts of sulphur that may be present. Accordingly, manganese should exist at a content of at least 0.01% and a suitable range of manganese is within 0.2-0.4%.

Chromium should be present at a minimum content of 16%, preferably at least 17% and even more preferred at least 18%, in order to give the steel a desired corrosion resistance. Chromium is also an important nitride former in order together with nitrogen to give the steel a content of 2-10% by volume of $M_2X$ carbides, nitrides and/or carbonitrides, where M is essentially Cr but also lower contents of Mo and Fe, contributing to desired galling and wear resistances in the steel. Chromium is however a strong ferrite former. In order to avoid ferrite after hardening, the content of chromium should not exceed 30%, preferably not be more than 27%, suitably not more than 25%.

Nickel is an optional element and as such it can optionally be included as an austenite stabilising element at a maximum content of 5.0%, suitably not more than 3.0%, in order to balance the high contents in the steel of the ferrite-forming elements chromium and molybdenum. Preferably, the steel according to the invention does however not contain any deliberately added nickel. Nickel can however be tolerated as an unavoidable impurity that as such can exist at a content of as much as about 0.8%.

Cobalt is also an optional element and as such it can optionally be included at a maximum content of 9%, suitably not more than 5%, in order to improve tempering resistance.

Molybdenum should exist in the steel as it contributes to give the steel a desired corrosion resistance, particularly against pit corrosion. Molybdenum is however a strong ferrite former, which means that the steel must not contain more than a maximum of 5.0%, preferably not more than 4.0%, suitably not more than 3.5% Mo. A nominal content of molybdenum is 1.3%.

In principle, molybdenum can be completely or partly replaced by tungsten, which however will not give the same improvement of corrosion resistance. The use of tungsten also requires twice the amount as compared to molybdenum, which is a drawback. Moreover, it renders scrap handling difficult.

Vanadium should be present in the steel at a content of 0.5-14%, preferably 1.0-13%, suitably 2.0-12%, in order, together with nitrogen and any existing carbon, to form said MX nitrides, carbides and/or carbonitrides. According to a first preferred embodiment of the invention, the content of vanadium is in the range of 0.5-1.5%. According to a second preferred embodiment, the content of vanadium is in the range of 1.5-4.0, preferably 1.8-3.5, even more preferred 2.0-3.5, and most preferred 2.5-3.0%. According to this second preferred embodiment, a nominal content of vanadium is 2.85%. In a third embodiment of the invention, the content of vanadium is in the range of 4.0-7.5, preferably 5.0-6.5, and even more preferred 5.3-5.7%. According to this third preferred embodiment, a nominal content of vanadium is 5.5%. In a fourth embodiment of the invention, the content of vanadium is in the range of 7.5-11.0, preferably 8.5-10.0, and even more preferred 8.8-9.2%. According to this fourth preferred embodiment, a nominal range of vanadium is 9.0%. Contents of vanadium of up to about 14% are conceivable within the scope of the invention, in combination with nitrogen contents of up to about 10% and carbon contents in the range of 0.1-2%, which will give the steel desirable properties, particularly when used in forming and cutting tools with high demands on corrosion resistance in combination with a high hardness (up to 60-62 HRC) and a moderate ductility as well as extremely high demands on wear resistance (abrasive/adhesive/smearing/fretting).

In principle, vanadium can be replaced by niobium in order to form MX nitrides, carbides and/or carbonitrides, but this requires a larger amount as compared to vanadium, which is a drawback. Niobium will also give the nitrides, carbides and/or carbonitrides a more angular shape and make them larger than pure vanadium nitrides, carbides and/or carbonitrides, which may initiate fractures or chipping, thereby decreasing toughness and finishing quality of the material. This may be particularly serious for the steel according to the first preferred embodiment of the invention, the composition of which being optimized in respect of its mechanical properties in order to achieve excellent wear resistance in combination with good ductility and high hardness. According to this first embodiment, the steel must accordingly not contain more than a maximum of 2%, preferably not more than 0.5%, suitably not more than 0.1% niobium. There may also be production problems, as Nb(C, N) may result in plugging of the tapping stream from the ladle during atomizing. According to this first embodiment, the steel must accordingly not contain more than a maximum of 6%, preferably not more than 2.5%, suitably not more than 0.5% niobium. In the most preferred embodiment, niobium is not tolerated in excess of an unavoidable impurity in the form of a residual element originating from the raw materials for the production of the steel.

The nitrogen content should, as mentioned, be adapted to the content of vanadium and any niobium in the material, in order to give the steel a content of 5-40% by volume of MX carbides, nitrides and/or carbonitrides. The conditions for the relation between N and (V+Nb/2) are given in FIG. 1 that shows the content of N in relation to the content of (V+Nb/2) for the steel according to the invention. The coordinates of the corner points of the shown areas are according to the table below:

TABLE 1

Relation between N and (V + Nb/2)

| | N | V + Nb/2 |
|---|---|---|
| A | 0.8 | 0.5 |
| A' | 0.6 | 0.5 |
| B | 1.4 | 0.5 |
| B' | 1.6 | 0.5 |
| C | 8.0 | 14.0 |
| D | 4.3 | 14.0 |
| E | 1.9 | 1.5 |
| E' | 3.1 | 4.0 |
| E'' | 4.8 | 7.5 |
| E''' | 6.5 | 11.0 |
| F | 2.2 | 1.5 |
| F' | 3.7 | 4.0 |
| F'' | 5.8 | 7.5 |
| F''' | 8.0 | 11.0 |
| G | 9.8 | 14.0 |
| H | 2.6 | 14.0 |
| I | 0.7 | 1.5 |
| I' | 1.1 | 4.0 |
| I'' | 1.6 | 7.5 |
| I''' | 2.1 | 11.0 |
| J | 1.1 | 1.5 |
| J' | 1.7 | 4.0 |
| J'' | 2.6 | 7.5 |
| J''' | 3.5 | 11.0 |

According to a first aspect of the invention, the content of N, on the one hand, and of (V+Nb/2) on the other hand, should be balanced in relation to each other such that the contents of these elements will lie within an area that is defined by the coordinates A', B', G, H, A'' in the coordinate system in FIG. 1. More preferably, the contents of these elements are balanced within an area that is defined by the coordinates A, B, C, D, A in the coordinate system in FIG. 1.

According to a second aspect of the invention, the content of N, on the one hand, and of (V+Nb/2) on the other hand, is balanced in relation to each other such that the contents of these elements will lie within an area that is defined by the coordinates F, G, H, I, F, and even more preferred within E, C, D, J, E in the coordinate system in FIG. 1.

According to a first preferred embodiment of the invention, the contents of nitrogen, vanadium and any niobium existing in the steel, should be balanced in relation to each other such that the contents lie within the area that is defined by the coordinates A', B', F, I, A', and even more preferred within A, B, E, J, A.

According to a second preferred embodiment of the invention, the contents of nitrogen, vanadium and any niobium existing in the steel, should be balanced in relation to each other such that the contents lie within the area that is defined by the coordinates I, F, F', I', I, and even more preferred within E, E', J', J, E.

According to a third preferred embodiment of the invention, the contents of nitrogen, vanadium and any niobium existing in the steel, should be balanced in relation to each other such that the contents lie within the area that is defined by the coordinates I', F', F'', I'', I', and even more preferred within E', E'', J'', J', E'.

According to a fourth preferred embodiment of the invention, the contents of nitrogen, vanadium and any niobium existing in the steel, should be balanced in relation to each other such that the contents lie within the area that is defined by the coordinates I'', F'', F''', I''', I'', and even more preferred within J'', E'', E''', J''', J''.

According to a fifth preferred embodiment of the invention, the contents of nitrogen, vanadium and any niobium existing in the steel, should be balanced in relation to each other such that the contents lie within the area that is defined by the coordinates I''', F''', G, H, I''', and even more preferred within J''', E''', C, D, J'''.

The tables below present four different compositions that exemplify the invention within the scope of the reasoning above.

Table 2a shows composition ranges for a steel according to the first preferred embodiment of the invention.

TABLE 2a

| | Element | | | | | | |
|---|---|---|---|---|---|---|---|
| | C % | Si % | Mn % | Cr % | Mo % | V % | N % |
| Min | 0.10 | 0.01 | 0.01 | 18.0 | 0.01 | 0.5 | 0.8 |
| Aim | 0.20 | 0.30 | 0.30 | 21.0 | 1.3 | 1.0 | 0.95 |
| Max | 0.50 | 1.5 | 1.5 | 21.5 | 2.5 | 2.0 | 2.0 |

Table 2b shows even more preferred composition ranges for a steel according to the first preferred embodiment of the invention.

TABLE 2b

| | Element | | | | | | |
|---|---|---|---|---|---|---|---|
| | C % | Si % | Mn % | Cr % | Mo % | V % | N % |
| Min | 0.13 | 0.1 | 0.1 | 20.6 | 0.8 | 0.8 | 0.8 |
| Aim | 0.20 | 0.30 | 0.30 | 21.0 | 1.3 | 1.0 | 0.95 |
| Max | 0.25 | 1.0 | 1.0 | 21.4 | 1.6 | 1.1 | 1.0 |

Table 2c shows most preferred composition ranges for a steel according to the first preferred embodiment of the invention.

TABLE 2c

| | Element | | | | | | |
|---|---|---|---|---|---|---|---|
| | C % | Si % | Mn % | Cr % | Mo % | V % | N % |
| Min | 0.15 | 0.1 | 0.1 | 20.6 | 0.8 | 0.8 | 0.8 |
| Aim | 0.20 | 0.30 | 0.30 | 21.0 | 1.3 | 1.0 | 0.95 |
| Max | 0.25 | 1.0 | 1.0 | 21.4 | 1.6 | 1.1 | 1.0 |

The steel according to the invention is suited to be used in forming and cutting tools with high demands on corrosion resistance in combination with a high hardness (up to 60-62 HRC) and a good ductility. The steel according to the first embodiment has the lowest demands on wear resistance according to the invention. All the same, the steel should have a good resistance against both abrasive and adhesive wear, as well as against galling and fretting, well in par with already known materials. With a composition according to the table, the steel has a matrix that after hardening from an austenitizing temperature of 950-1150° C. and low temperature tempering at about 200-300° C., 2×2 h, or high temperature tempering at 450-550° C., 2×2 h, is composed of tempered martensite with a content of hard phases that consists of up to a total of about 10% by volume of $M_2X$, where M is essentially Cr and X is essentially N, and MX, where M is essentially V and X is essentially N.

Table 3a shows composition ranges for a steel according to the second preferred embodiment of the invention.

TABLE 3a

| | Element | | | | | | |
|---|---|---|---|---|---|---|---|
| | C % | Si % | Mn % | Cr % | Mo % | V % | N % |
| Min | 0.10 | 0.01 | 0.01 | 18.0 | 0.01 | 2.0 | 1.3 |
| Aim | 0.20 | 0.30 | 0.30 | 21.0 | 1.3 | 2.85 | 2.1 |
| Max | 0.50 | 1.5 | 1.5 | 21.5 | 2.5 | 4.0 | 3.0 |

Table 3b shows even more preferred composition ranges for a steel according to the second preferred embodiment of the invention.

TABLE 3b

| | Element | | | | | | |
|---|---|---|---|---|---|---|---|
| | C % | Si % | Mn % | Cr % | Mo % | V % | N % |
| Min | 0.12 | 0.1 | 0.1 | 20.6 | 1.1 | 2.7 | 1.9 |
| Aim | 0.20 | 0.30 | 0.30 | 21.0 | 1.3 | 2.85 | 2.10 |
| Max | 0.35 | 1.0 | 1.0 | 21.4 | 1.4 | 3.0 | 2.2 |

Table 3c shows most preferred composition ranges for a steel according to the second preferred embodiment of the invention.

TABLE 3c

| | Element | | | | | | |
|---|---|---|---|---|---|---|---|
| | C % | Si % | Mn % | Cr % | Mo % | V % | N % |
| Min | 0.13 | 0.1 | 0.1 | 20.6 | 1.1 | 2.7 | 1.9 |
| Aim | 0.20 | 0.30 | 0.30 | 21.0 | 1.3 | 2.85 | 2.10 |
| Max | 0.35 | 1.0 | 1.0 | 21.4 | 1.4 | 3.0 | 2.2 |

The steel according to the second embodiment is well suited to be used in forming and cutting tools with high demands on corrosion resistance in combination with a high hardness (up to 60-62 HRC) and a good ductility, as well as increased demands on resistance against both abrasive and adhesive wear and against galling and fretting. With a composition according to the table, the steel has a matrix that after hardening from an austenitizing temperature of 950-1150° C. and low temperature tempering at about 200-300° C., 2×2 h, or high temperature tempering at 450-550° C., 2×2 h, is composed of tempered martensite with a content of hard phases that consists of up to about 10% by volume each of $M_2X$, where M is essentially Cr and X is essentially N, and MX, where M is essentially V and X is essentially N.

Table 4a shows composition ranges for a steel according to the third preferred embodiment of the invention.

TABLE 4a

| | Element | | | | | | |
|---|---|---|---|---|---|---|---|
| | C % | Si % | Mn % | Cr % | Mo % | V % | N % |
| Min | 0.10 | 0.01 | 0.01 | 18.0 | 0.01 | 4.0 | 1.5 |
| Aim | 0.20 | 0.30 | 0.30 | 21.0 | 1.3 | 5.5 | 3.0 |
| Max | 0.80 | 1.5 | 1.5 | 21.5 | 2.5 | 7.5 | 5.0 |

Table 4b shows composition ranges for a steel according to an even more preferred form of the third preferred embodiment of the invention.

TABLE 4b

| | Element | | | | | | |
|---|---|---|---|---|---|---|---|
| | C % | Si % | Mn % | Cr % | Mo % | V % | N % |
| Min | 0.12 | 0.1 | 0.1 | 20.6 | 1.1 | 5.3 | 2.8 |
| Aim | 0.20 | 0.30 | 0.30 | 21.0 | 1.3 | 5.5 | 3.0 |
| Max | 0.50 | 1.0 | 1.0 | 21.4 | 1.4 | 5.6 | 3.1 |

The steel according to the third embodiment is well suited to be used in forming and cutting tools with high demands on corrosion resistance in combination with a high hardness (up to 60-62 HRC) and a good ductility, as well as high demands on wear resistance (abrasive/adhesive/galling/fretting). With a composition according to the table, the steel has a matrix that after hardening from an austenitizing temperature of about 1120° C. and low temperature tempering at about 200-300° C., 2×2 h, or high temperature tempering at 450-550° C., 2×2 h, is composed of tempered martensite with a content of hard phases that consists of about 2-7% by volume of $M_2X$, where M is essentially Cr and X is essentially N, and 10-20% by volume of MX, where M is essentially V and X is essentially N.

Table 5a shows composition ranges for a steel according to the fourth preferred embodiment of the invention.

TABLE 5a

| | Element | | | | | | |
|---|---|---|---|---|---|---|---|
| | C % | Si % | Mn % | Cr % | Mo % | V % | N % |
| Min | 0.10 | 0.01 | 0.01 | 18.0 | 0.01 | 7.5 | 2.5 |
| Aim | 0.20 | 0.30 | 0.30 | 21.0 | 1.30 | 9.0 | 4.3 |
| Max | 1.5 | 1.5 | 1.5 | 21.5 | 2.5 | 11 | 6.5 |

Table 5b shows composition ranges for a steel according to an even more preferred form of the fourth preferred embodiment of the invention.

TABLE 5b

| | Element | | | | | | |
|---|---|---|---|---|---|---|---|
| | C % | Si % | Mn % | Cr % | Mo % | V % | N % |
| Min | 0.12 | 0.1 | 0.1 | 20.6 | 1.1 | 8.8 | 4.1 |
| Aim | 0.20 | 0.30 | 0.30 | 21.0 | 1.30 | 9.0 | 4.3 |
| Max | 0.50 | 1.0 | 1.0 | 21.4 | 1.4 | 9.2 | 4.4 |

The steel according to the fourth embodiment is well suited to be used in forming and cutting tools with high demands on corrosion resistance in combination with a high hardness (up to 60-62 HRC) and a relatively good ductility, as well as very high demands on wear resistance (abrasive/adhesive/galling/fretting). With a composition according to the table, the steel has a matrix that after hardening from an austenitizing temperature of about 1120° C. and low temperature tempering at about 200-300° C., 2×2 h, or high temperature tempering at 450-550° C., 2×2 h, is composed of tempered martensite with a content of hard phases that consists of about 3-8% by volume of $M_2X$, where M is essentially Cr and X is essentially N, and 15-25% by volume of MX, where M is essentially V and X is essentially N.

It is conceivable within the concept of the invention to allow a nitrogen content of up to about 10%, which in combination with a vanadium content of up to about 14% and a carbon content in the range of 0.1-2% will give the steel its desired properties, particularly when used in forming and cutting tools with high demands on corrosion resistance in combination with a high hardness (up to about 60-62 HRC) and a moderate ductility as well as extremely high demands on wear resistance (abrasive/adhesive/smear/fretting). The steel according to this embodiment has a matrix that after hardening from an austenitizing temperature of about 1100° C. and low temperature tempering at about 200-300° C., 2×2 h, or tempering at 450-550° C., 2×2 h, is composed of tempered martensite with a content of hard phases that consists of about 2-10 and 30-40% by volume respectively of $M_2X$, where M is essentially Cr and X is essentially N, and MX, where M is essentially V and X is essentially N.

The steel according to the above described embodiments is suited to be used primarily for the manufacturing of tools for injection moulding, compression moulding and extrusion of plastic components that exhibit a very good corrosion resistance, at the same time as the steel should have a very good resistance against mixed adhesive and abrasive wear, particularly a good resistance against galling and fretting, as well as a high hardness. The steel according to the above described embodiments is also suited for tools for the forming of plastics, tools for the forming and cutting of sheets in cold-working applications, tools for the pressing of powder, construction components such as injection nozzles for engines, wear parts, pump parts, bearing components etc., as well as for knives for use in food industry.

Besides the alloy materials mentioned, the steel need not, and should not, comprise any additional alloy elements in significant amounts. Some materials are explicitly unwanted, since they affect the properties of the steel in an undesired manner. This is true for example for phosphorous that should be kept at the lowest possible level, preferably 0.03% at the most, in order not to negatively affect the toughness of the steel. Also sulphur is an element that is undesired in most respects, but its negative influence primarily on toughness can be considerably neutralised by aid of manganese that forms essentially harmless manganese sulphides, and therefore it can be tolerated at a maximum content of about 0.5% in order to improve the machinability of the steel. Also titanium, zirconium and aluminum are undesired in most respects, but the total maximum content of these elements may be allowed to about 7%, but normally at much lower contents, <0.1% in total.

In the heat treatment of the steel it is austenitized at a temperature of between 950° C. and 1150° C., preferably between 1020° C. and 1130° C., most preferred between 1050° C. and 1120° C. A higher austenitizing temperature is in principle conceivable but is unsuited when considering that conventionally existing tempering furnaces are not adapted to higher temperatures. A suitable holding time at the austenitizing temperature is 10-30 min. The steel is cooled from the said austenitizing temperature to ambient temperature or lower. In the form of a machined tool part, the steel can be deep frozen to −40° C. or lower. Deep freezing can accordingly be applied in order to eliminate any existing residual austenite, with the purpose of giving the product a desired dimensional stability, which is suitably performed in dry ice to about −70 or −80° C., or in liquid nitrogen all the way down to about −196° C. In order to achieve an optimal corrosion resistance, the tool is low temperature tempered at 200-300° C., at least once, preferably at least twice. If it is desired instead to optimize the steel in order to achieve a secondary hardening, the product is high temperature tempered at least once, preferably twice, and optionally several times at a temperature of between 400-560° C., preferably at 450-525° C. After each such tempering treatment, the product is cooled. Also in this case deep freezing is preferably applied according to the above, in order to further ensure a desired dimensional stability by elimination of any residual austenite. The holding time at the tempering temperature can be 1-10 h, preferably 1-2 h.

In connection with the various heat treatments to which the steel is exposed, such as in the hot pressing of the metal powder to form a consolidated, completely dense body, and in the hardening of the final tool part, neighbouring carbides, nitrides and/or carbonitrides may coalesce to form larger aggregates. The size of these hard phase particles in the final, heat treated product may accordingly exceed 3 μm. Expressed in % by volume, the major part is in the range of 1-10 μm, as measured in the longest extension of the particles. The total amount of hard phases depends on nitrogen content and the content of nitride formers, i.e. mainly vanadium and chromium. Generally, the total amount of hard phases in the final product is in the range of 5-40% by volume. Although the steel material according to the invention has been developed primarily in order to be used in tools for injection moulding, compression moulding and extrusion of plastic components, particularly tools for the forming of plastics and tools for the forming and cutting of sheets in cold-working applications, it can also be used for other purposes, e.g. in construction components such as injection nozzles for engines, wear parts, pump parts, bearing components etc., and in tools intended to be used in food industry, or in other industrial applications with high demands on corrosion.

Other characteristics and aspects of the invention are clear from the following account of tests that have been made, and from the appended claims.

BRIEF DESCRIPTION OF THE DRAWINGS

In the following description of tests that have been made, reference will be made to the enclosed drawings, of which

DESCRIPTION OF EMBODIMENT(S) OF THE INVENTION

Experiments in Laboratory Scale

The chemical compositions of tested materials are presented in Table 6 below. Steels no. 1-4 and 9 and 10 are reference materials in the form of commercial steels manufactured by the applicant, while steels no. 5-8 are steels according the invention. Steels no. 3-9 were made into powder by nitrogen gas atomizing. The steels according to the invention were subjected to solid phase nitration to the given nitrogen contents. 6 kg of the respective processed steel powders were encapsulated and thereafter exposed to hot isostatic compaction to give complete densification of the materials. The HIP:ed ingots were forged into rods of 40×40 mm, whereafter the rods were allowed to cool in vermiculite.

TABLE 6

Chemical composition in % by weight for the tested steels; balance iron and impurities at normal contents.

| Steel material | C | Si | Mn | Cr | Ni | Mo | W | V | N |
|---|---|---|---|---|---|---|---|---|---|
| 1 | 0.38 | 1.0 | 0.40 | 13.6 | — | — | — | 0.30 | 0.02 |
| 2 | 0.25 | 0.35 | 0.55 | 13.5 | 1.34 | — | — | 0.35 | 0.12 |
| 3 | 1.70 | 0.80 | 0.30 | 18.0 | — | 1.0 | — | 3.0 | — |
| 4 | 2.60 | 0.47 | 0.38 | 21.3 | — | 1.67 | — | 5.48 | 0.22 |
| 5 | 0.74 | 0.29 | 0.35 | 18.3 | — | 0.01 | — | 8.9 | 2.5 |
| 6 | 0.74 | 0.29 | 0.35 | 18.3 | — | 0.01 | — | 8.9 | 3.1 |
| 7 | 0.18 | 0.25 | 0.36 | 20.6 | — | 1.42 | — | 8.9 | 4.3 |
| 8 | 0.18 | 0.25 | 0.36 | 20.6 | — | 1.42 | — | 8.9 | 5.2 |
| 9 | 1.15 | 0.50 | 0.40 | 4.5 | — | 3.2 | 3.7 | 8.5 | 1.8 |
| 10 | 1.55 | 0.3 | 0.3 | 11.8 | | 0.8 | | 0.8 | |

Figure 1:
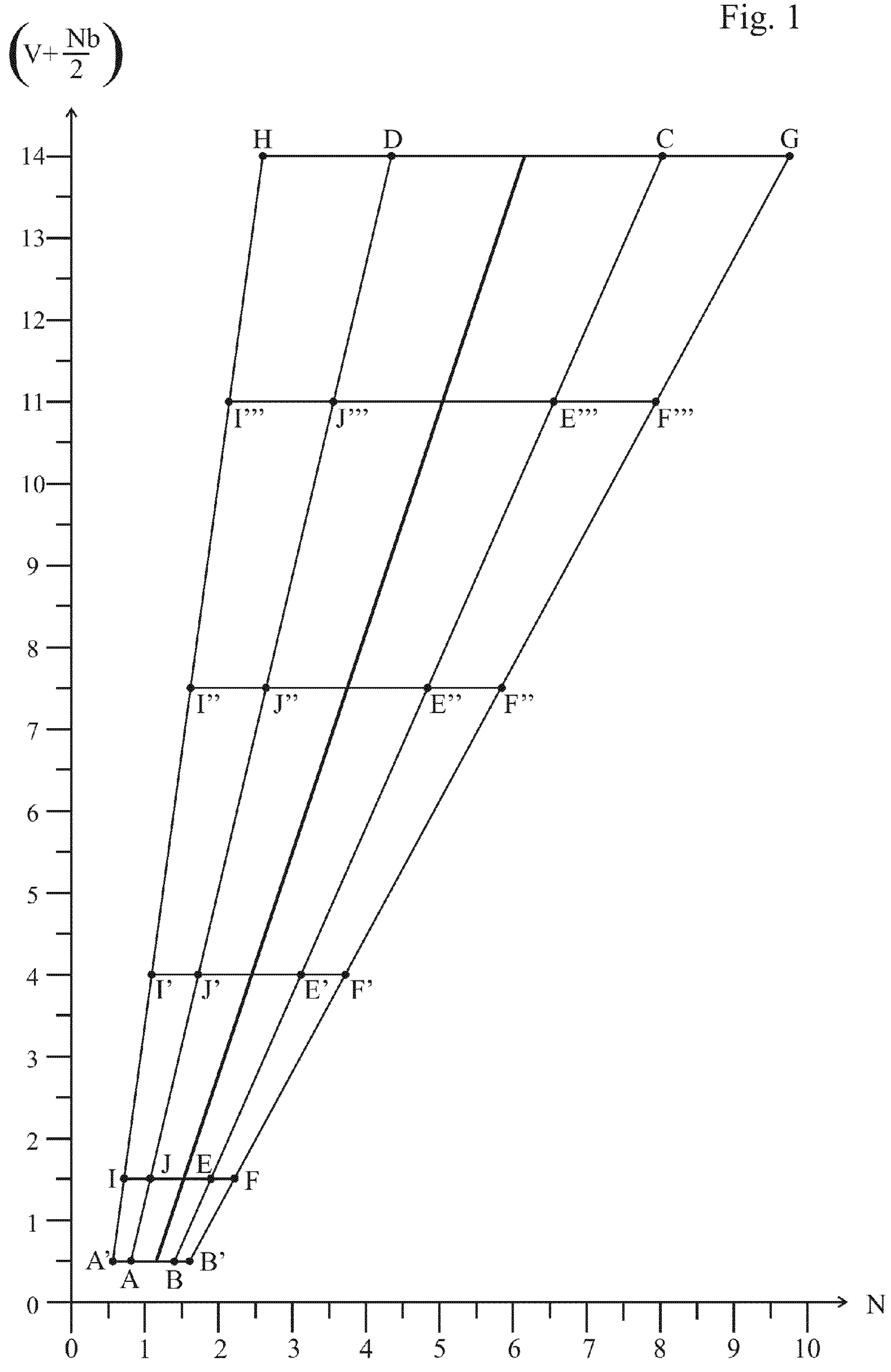
FIG. 1 shows the relation between the content of N and the content of (V+Nb/2) for the steel according to the invention, in the form of a system of coordinates.
Figure 2A:
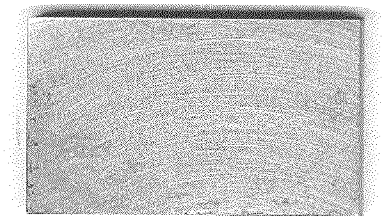
FIG. 2*a*-2*f* are photographs showing tested steels after testing in salt-fog, FIG. 3, 4*a*, 4*b* show polarisation graphs in 0.05 M $H_2SO_4$ for some reference steels, FIG. 5, 6, 7*a*, 7*b*, 8 show polarisation graphs in 0.05 M $H_2SO_4$ for some steels according to the invention.
Figure 2C:
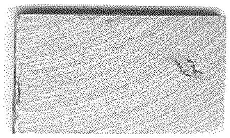
Figure 2B:
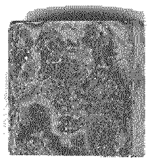
Figure 2D:
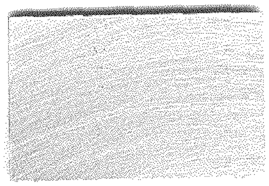
Figure 2E:
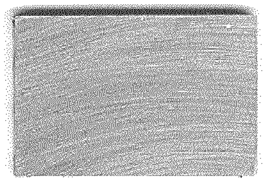
Figure 2F:
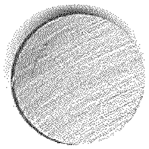

As mentioned above, it has been shown that the steel according to the invention achieves properties that are very well suited for the purpose, in particular corrosion properties, if the composition of the steel is balanced in respect of the content of N in relation to the content of (V+Nb/2). FIG. 1 shows the relation between the content of N and the content of (V+Nb/2) for the steel according to the invention, in the form of a system of coordinates. For the steel according to the invention it should apply that the coordinates for N on the one hand and for (V+Nb/2) on the other hand, should be within the area that is defined by the corner points A', B', G, H, A' in the coordinate system in FIG. 1. More specifically it should apply for the steel according to the invention that it, according to a first aspect of the invention, should have contents of N and (V+Nb/2) that are balance in relation to each other such that the contents of these elements are within an area that is defined by the coordinates A', B', G, H, A' in the coordinate system according to FIG. 1. More preferably, the contents of these elements are balanced within an area that is defined by the coordinates A, B, C, D, A.

According to a second aspect of the invention, the contents of N on the one hand and of (V+Nb/2) on the other hand should be balanced in relation to each other such that the contents of these elements are within an area that is defined by the coordinates F, G, H, I, F, and even more preferred within E, C, D, J, E in the system of coordinates in FIG. 1.

According to a first preferred embodiment of the invention, the contents of nitrogen, vanadium and any existing niobium in the steel, should be balanced in relation to each other such that the contents are within the area that is defined by the coordinates A', B', F, I, A', and more preferred within A, B, E, J, A. The steel according to the invention is suited to be used in forming and cutting tools with high demands on corrosion resistance in combination with a high hardness (up to 60-62 HRC) and a good ductility. The steel according to the first embodiment has the lowest demands on wear resistance according to the invention. All the same, the steel should have a good resistance against both abrasive and adhesive wear, as well as against galling and fretting, well in par with already known materials. With a nominal composition according to the table, the steel has a matrix that after hardening from an austenitizing temperature of 950-1150° C. and low temperature tempering at about 200-300° C., 2×2 h, or high temperature tempering at 450-550° C., 2×2 h, is composed of martensite with a content of hard phases that consists of up to a total of about 10% by volume of $M_2X$, where M is essentially Cr and X is essentially N, and MX, where M is essentially V and X is essentially N.

According to a second preferred embodiment of the invention, the contents of nitrogen, vanadium and any existing niobium in the steel, should be balanced in relation to each other such that the contents are within the area that is defined by the coordinates I, F, F', I', I, and more preferred within E, E', J', J, E. The steel according to the second embodiment is well suited to be used in forming and cutting tools with high demands on corrosion resistance in combination with a high hardness (up to 60-62 HRC) and a good ductility, as well as increased demands on resistance against both abrasive and adhesive wear and against galling and fretting. With a nominal composition according to the table, the steel has a matrix that after hardening from an austenitizing temperature of 950-1150° C. and low temperature tempering at about 200-300° C., 2×2 h, or high temperature tempering at 450-550° C., 2×2 h, is composed of tempered martensite with a content of hard phases that consists of up to about 10% by volume each of $M_2X$, where M is essentially Cr and X is essentially N, and MX, where M is essentially V and X is essentially N.

According to a third preferred embodiment, the contents of nitrogen, vanadium and any existing niobium in the steel, should be balanced in relation to each other such that the contents are within the area that is defined by the coordinates I', F', F", I", I', and more preferred within E', E", J", J', E'. The steel according to the third embodiment is well suited to be used in forming and cutting tools with high demands on corrosion resistance in combination with a high hardness (up to 60-62 HRC) and a good ductility, as well as increasing demands on wear resistance (abrasive/adhesive/galling/fretting). With a nominal composition according to the table, the steel has a matrix that after hardening from an austenitizing temperature of about 1120° C. and low temperature tempering at about 200-300° C., 2×2 h, or high temperature tempering at 450-550° C., 2×2 h, is composed of tempered martensite with a content of hard phases that consists of about 2-7% by volume of $M_2X$, where M is essentially Cr and X is essentially N, and 10-20% by volume of MX, where M is essentially V and X is essentially N.

According to a fourth preferred embodiment, the contents of nitrogen, vanadium and any existing niobium in the steel, should be balanced in relation to each other such that the contents are within the area that is defined by the coordinates I", F", F'", I'", I", and more preferred within J", E", E'", J'", J". The steel according to the fourth embodiment is well suited to be used in forming and cutting tools with high demands on corrosion resistance in combination with a high hardness (up to 60-62 HRC) and a good ductility, as well as increasing demands on wear resistance (abrasive/adhesive/galling/fretting). With a nominal composition according to the table, the steel has a matrix that after hardening from an austenitizing temperature of about 1120° C. and low temperature tempering at about 200-300° C., 2×2 h, or high temperature tempering at 450-550° C., 2×2 h, is composed of tempered martensite with a content of hard phases that consists of about 3-8% by volume of $M_2X$, where M is essentially Cr and X is essentially N, and 15-25% by volume of MX, where M is essentially V and X is essentially N.

According to a fifth preferred embodiment, the contents of nitrogen, vanadium and any existing niobium in the steel, should be balanced in relation to each other such that the contents are within the area that is defined by the coordinates I'", F'", G, H, I'", and more preferred within J'", E'", C, D, J'". The steel according to the fifth embodiment is well suited to be used in forming and cutting tools with high demands on corrosion resistance in combination with a high hardness (up to 60-62 HRC) and a moderate ductility, as well as extremely high demands on wear resistance (abrasive/adhesive/smear/fretting). The steel according to this embodiment has a matrix that after hardening from an austenitizing temperature of about 1100° C. and low temperature tempering at about 200-300° C., 2×2 h, or tempering at 450-550° C., 2×2 h, is composed of tempered martensite with a content of hard phases that consists of about 2-10 and 30-40% by volume respectively of $M_2X$, where M is essentially Cr and X is essentially N, and MX, where M is essentially V and X is essentially N.

The following tests were made:

- Hardness (HB) after soft-annealing
- Corrosion resistance
- Testing of adhesive wear
- Microstructure in the soft-annealed and in the hardened and tempered condition
- Hardness after austenitizing at between 950-1100° C./30 min/fan and 10 min/fan, and after tempering at 200-500° C., 2×2 h, for chosen austenitizing temperatures
- Determination of residual austenite after the above mentioned heat treatments Soft-Annealed Hardness The soft-annealed hardness for four steels is shown in Table 7. Steels no. 5 and 6 have been soft-annealed according to the cycle of steel 3, which is probably not optimal. It is clear from the table that steels no. 5 and 6, that represent the invention, have hardnesses at the same level as reference material no. 4, which is acceptable from a machinability point of view. Previous experiences show that powder metallurgically manufactured steels (PM steels) that are nitrogen alloyed and that have a finer distribution of hard phases than do PM steels that are not nitrogen alloyed, exhibit a good machinability also at a higher soft-annealed hardness (about 300-330 HB).

TABLE 7

| Soft-annealed hardness | |
|---|---|
| Steel material | Hardness (HB) |
| 3 | 266 |
| 4 | 305 |
| 5 | 302 |
| 6 | 317 |

Corrosion Resistance

The corrosion resistance of the steel according to the invention was compared with reference materials in various corrosive environments. The corrosion resistance was measured through the following test methods:

- Evaluation of resistance to polarisation in 0.05 M $H_2SO_4$ at pH 1.2.
- Testing of resistance to local corrosion, CPT, in 3% NaCl, pH 6.1, or in 0.01 M, 0.3% NaCl.
- Testing in salt-fog, 5 min salt-fog/55 min rest during 7 days, 3% NaCl, 0.37% HCl, pH 1.5, T=20° C., (SD1)
- Testing in salt-fog, 5 min salt-fog/55 min rest during 7 days, 3% NaCl, 0.37% HCl, pH 1.5, T=20° C., (SD2)
- Registering of polarisation graphs in acidic chloride solution, 0.1 M HCl, 3500 ppm chloride, by a method based on ASTM G5.

The first test in $H_2SO_4$ gives a picture of the general corrosion resistance, e.g. from condensate water in a forming cavity, whereas the following four test methods give a picture of the corrosion resistance in the presence of aggressive chloride ions, e.g. in cooling channels in form racks.

The results of the corrosion tests are shown in the following description and in Table 8 below, which also presents a theoretical calculation of the resistance to pitting, PRE, (the sum of the dissolved contents of N, Mo and Cr in the matrix when the steel is in its hardened condition). It is clear that the steels according to the invention have the highest PRE, accordingly indicating a very good resistance to pitting.

TABLE 8

Corrosion data for tested steels at various heat treatment conditions

| Steel No. | Heat treatment $T_A$ (° C.)/time (min) + $T_{temp}$ (° C.)/time (h) | PRE at $T_A$ (20N + 3.3Mo + Cr) | CPT (° C.) | SD1 0 = no attack 100 = entire surface corroded | SD2 0 = no attack 100 = entire surface corroded |
|---|---|---|---|---|---|
| 2 | 1020/30 + 200/2 × 2 | 13.8 | | — | — |
| 2 | 1020/30 + 250/2 × 2 | — | 49/20[1] | 0 | 10 |
| 2 | 1020/30 + 450/2 × 2 | | | — | — |
| 2 | 1020/30 + 500/2 × 2 | | | — | — |
| 3 | 1080/30 + 200/2 × 2 | 14.7 | <13 | 70 | — |

TABLE 8-continued

Corrosion data for tested steels at various heat treatment conditions

| Steel No. | Heat treatment $T_A$ (° C.)/time (min) + $T_{temp}$ (° C.)/time (h) | PRE at $T_A$ (20N + 3.3Mo + Cr) | CPT (° C.) | SD1 0 = no attack 100 = entire surface corroded | SD2 0 = no attack 100 = entire surface corroded |
|---|---|---|---|---|---|
| 3 | 1080/30 + 500/2 × 2 | | | — | — |
| 4 | 1080/30 + 200/2 × 2 | 15.9 | <13 | 70 | — |
| 4 | 1080/30 + 500/2 × 2 | | | — | — |
| 5 | 1050/30 + 200/2 × 2 | 19.8 | | — | — |
| 5 | 1050/30 + DF + 200/2 × 2 | | | 0 | 0 |
| 5 | 1050/30 + 450/2 × 2 | | | — | — |
| 5 | 1050/30 + 500/2 × 2 | | | 10 | — |
| 5 | 1100/30 + 200/2 × 2 | | 43 | — | — |
| 6 | 1000/30 + 200/2 × 2 | | 37 | 0 | 5 |
| 6 | 1050/30 + 200/2 × 2 | 20.8 | | — | — |
| 6 | 1050/30 + 450/2 × 2 | | | 0 | 20 |
| 7 | 1050/30 + 200/2 × 2 | 30.8 | | — | — |
| 7 | 1050/30 + 450/2 × 2 | | | — | — |
| 7 | 1050/30 + 500/2 × 2 | | | — | — |
| 7 | 1100/30 + 200/2 × 2 | 31.1 | 45[1] | 0 | 0 |
| 7 | 1100/30 + DF + 200/2 × 2 | | | 0 | 0 |
| 7 | 1100/30 + 450/2 × 2 | | | — | — |
| 7 | 1100/30 + 500/2 × 2 | | | — | — |
| 7 | 1100/30 + DF + 500/2 × 2 | | | 0 | 0 |
| 8 | 1050/30 + 200/2 × 2 | 23.3 | | 0 | 5 |
| 8 | 1050/30 + 500/2 × 2 | | | 10 | |
| 8 | 1100/30 + 200/2 × 2 | 26.0 | | — | — |
| 8 | 1100/30 + 500/2 × 2 | | | — | — |

CPT denotes the resistance to local corrosion in 3% NaCl at pH = 6.1 or 0.01M 0.3% NaCl. Values marked by 1 are tested in 0.05M NaCl. The higher the critical temperature is before pitting takes place, the better the corrosion resistance is.
SD1 is testing in salt-fog in 5% NaCl, pH = 3.1, 20° C. (5 min salt-fog/55 min rest) during 5 h, gamut 0-100, where 0 = no attack, 100 = the entire surface corroded.
SD2 is testing in salt-fog of samples that were not attacked in SD1, in 3% NaCl, pH = 1.5, 20° C. (5 min salt-fog/55 min rest) during 7 h, gamut 0-100, where 0 = no attack, 100 = the entire surface corroded.

Evaluation of Resistance to Polarisation in 0.05M $H_2SO_4$

Figure 3:
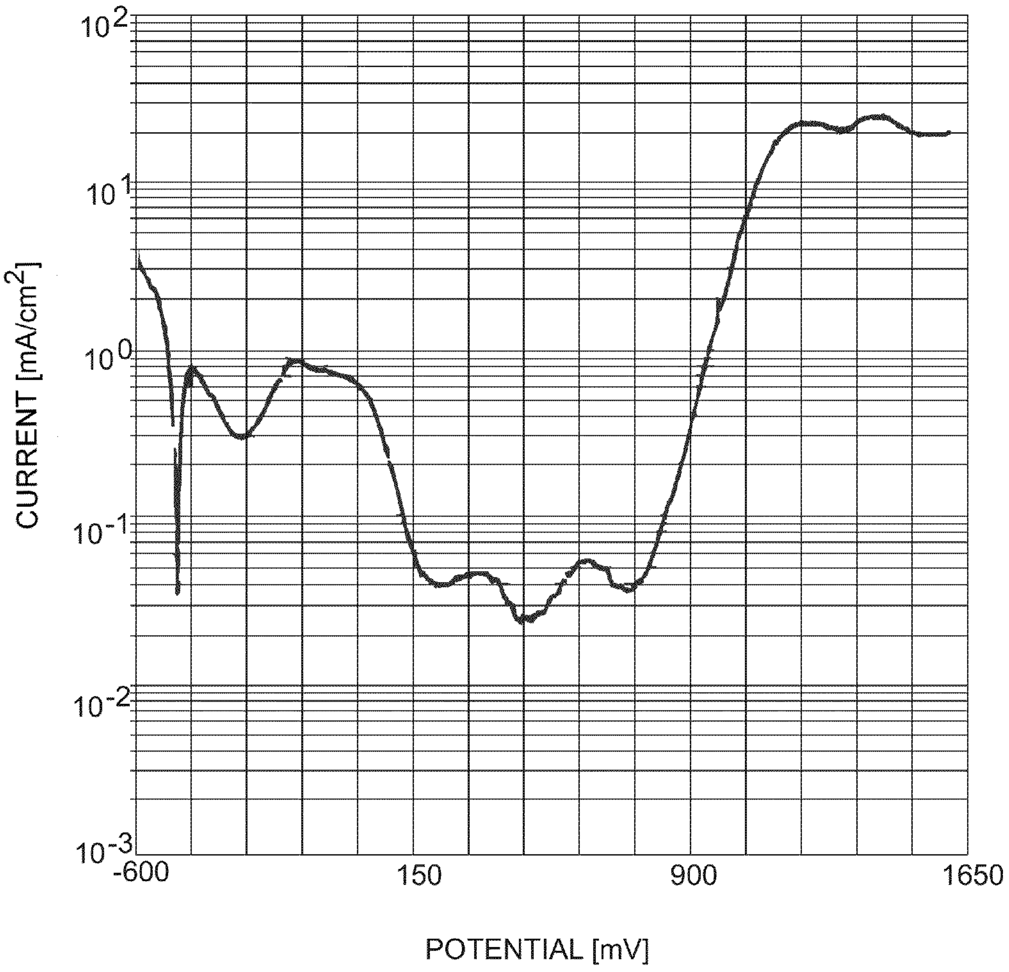
Figure 4A:
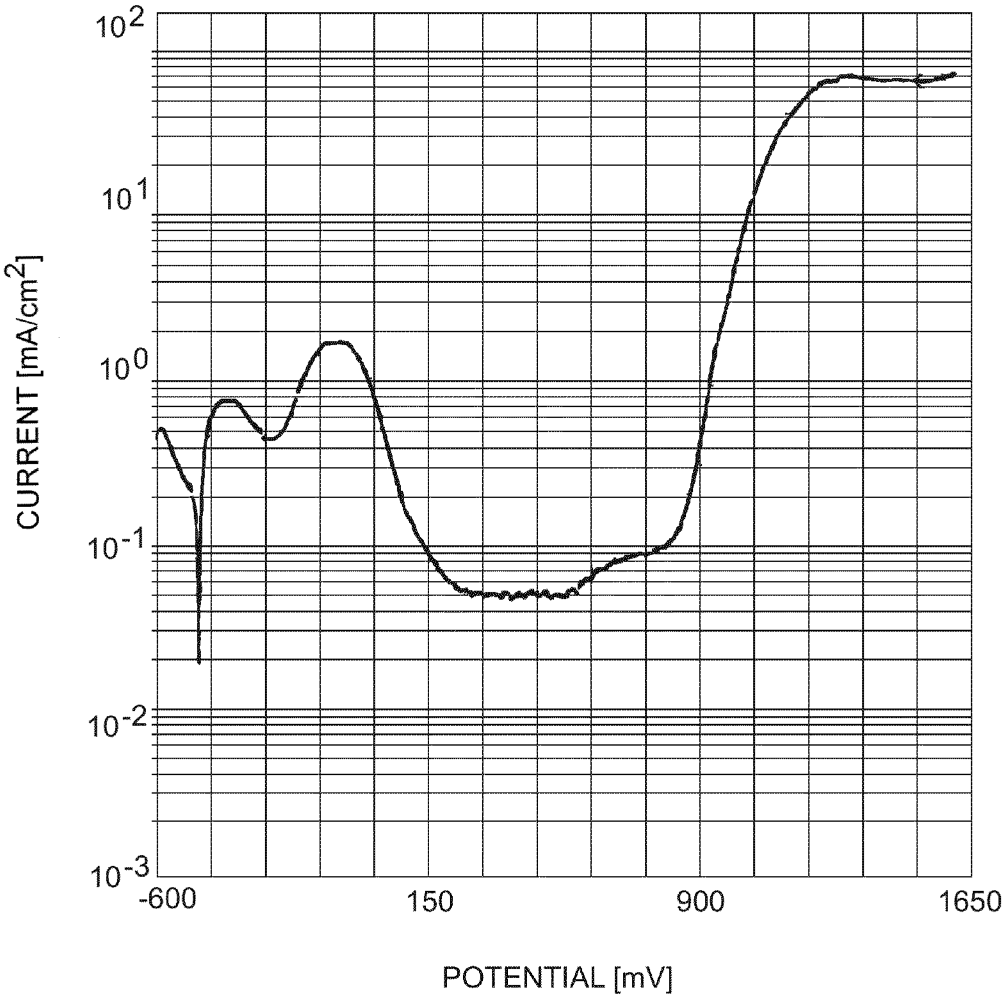
Figure 4B:
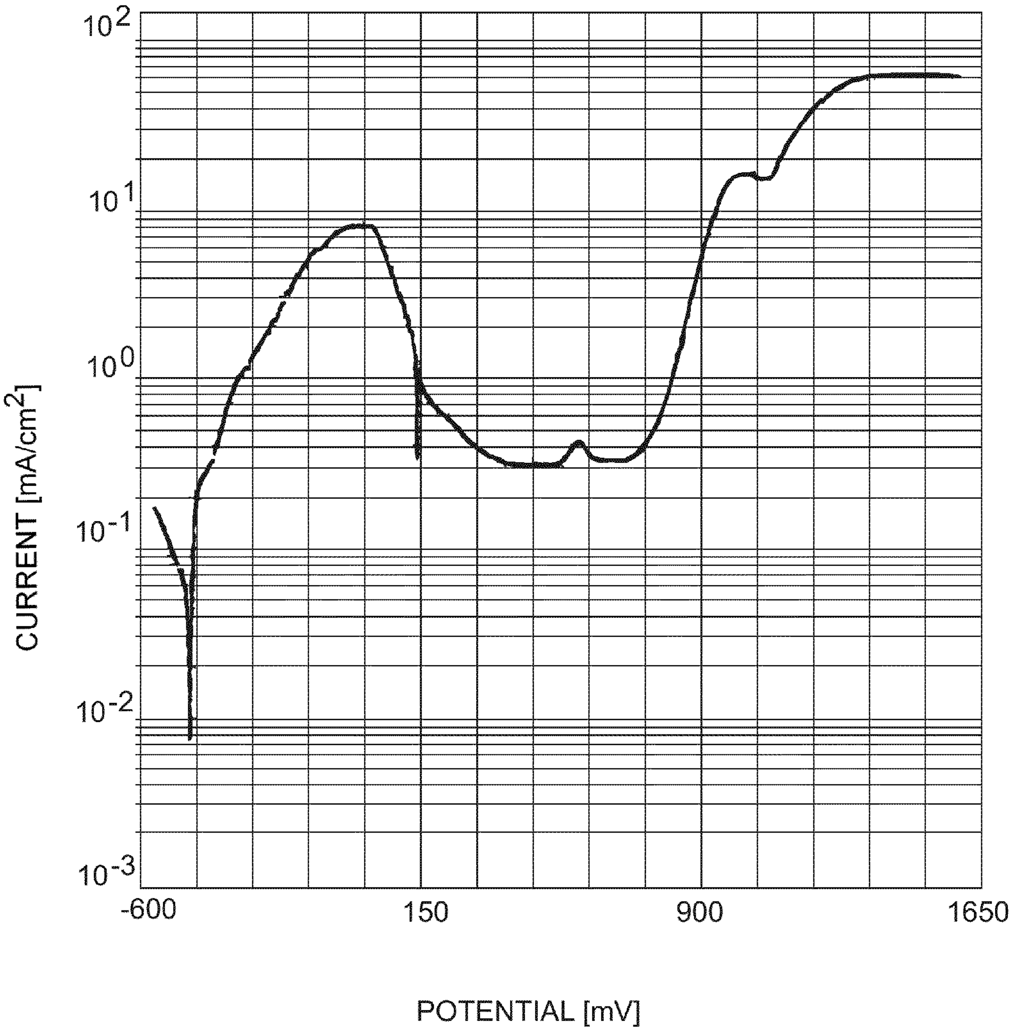
Figure 5:
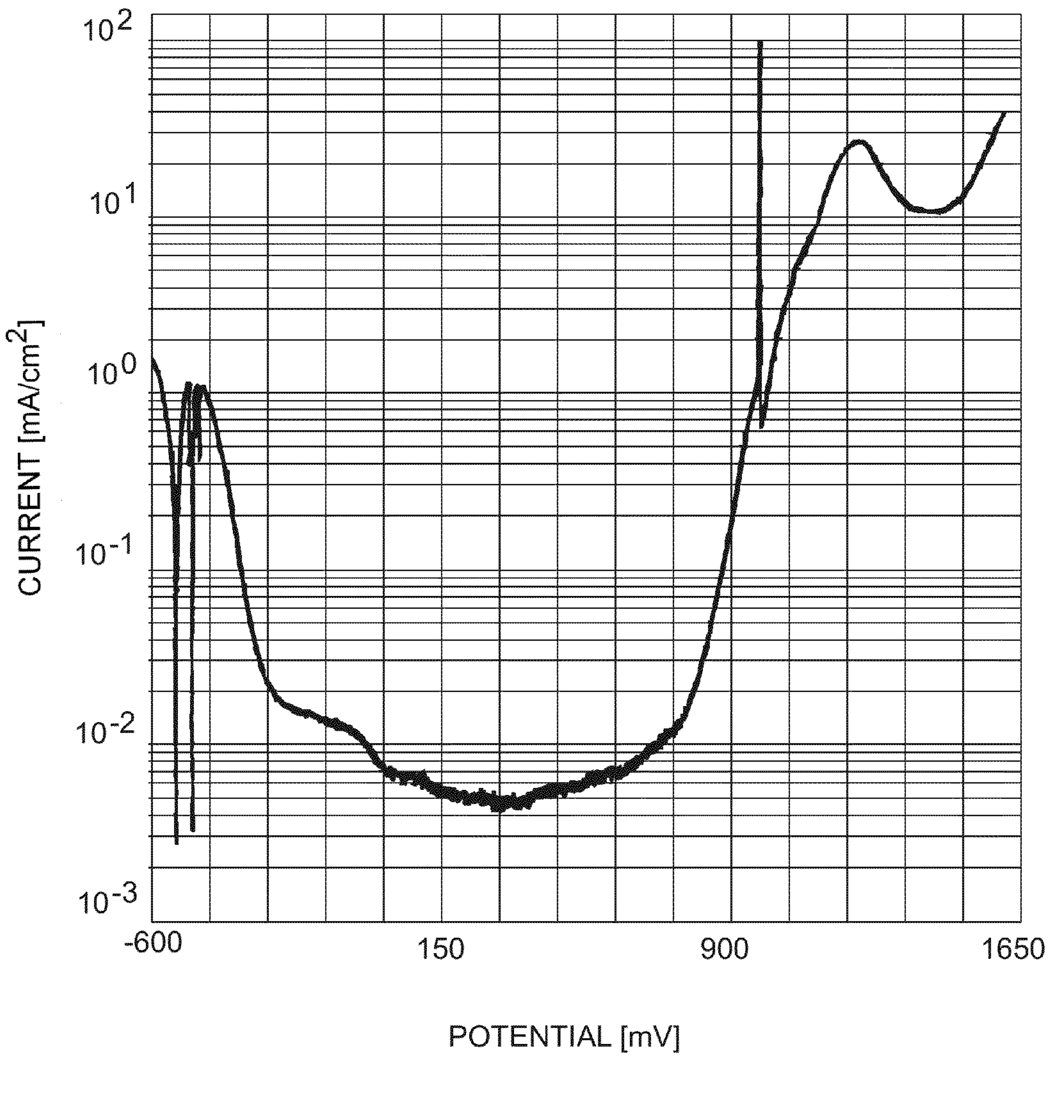
Figure 6:
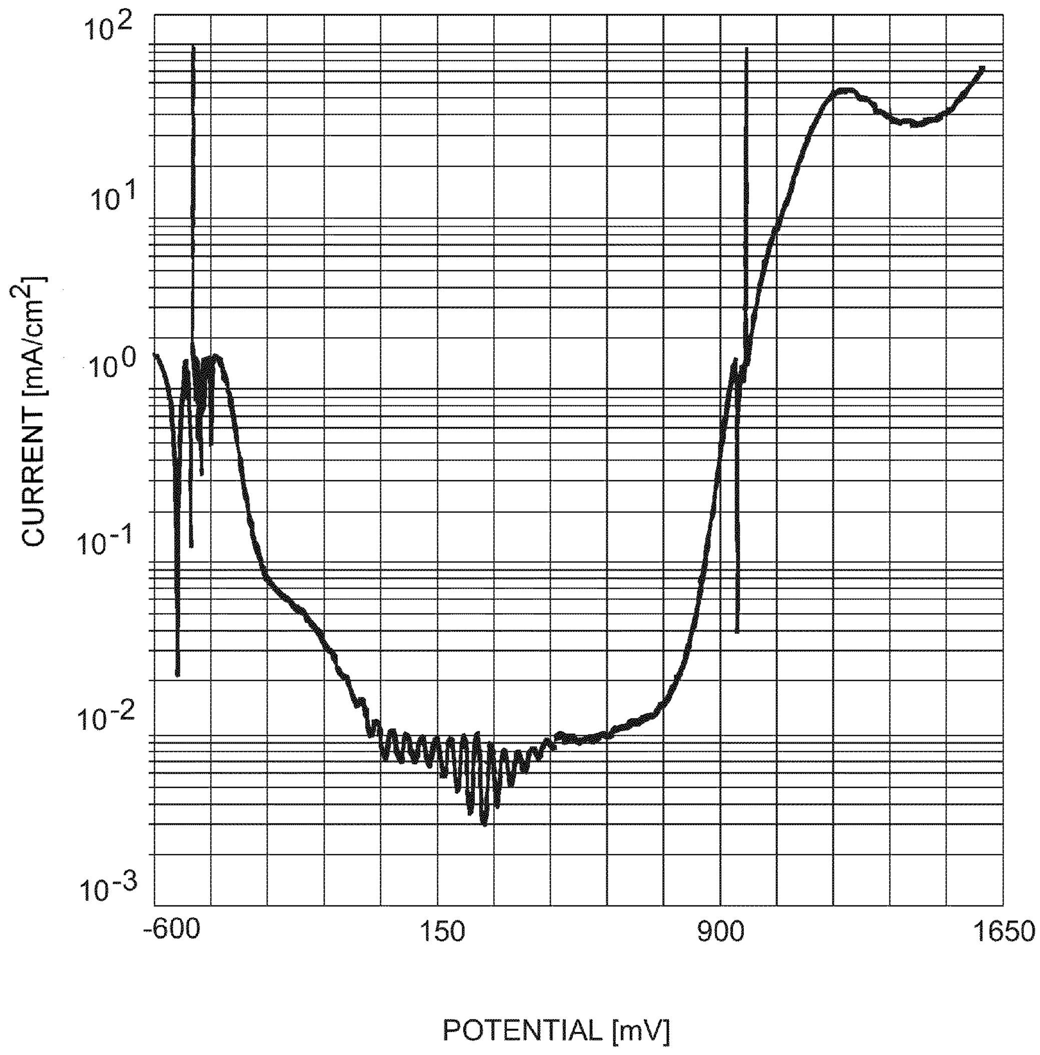
Figure 7A:
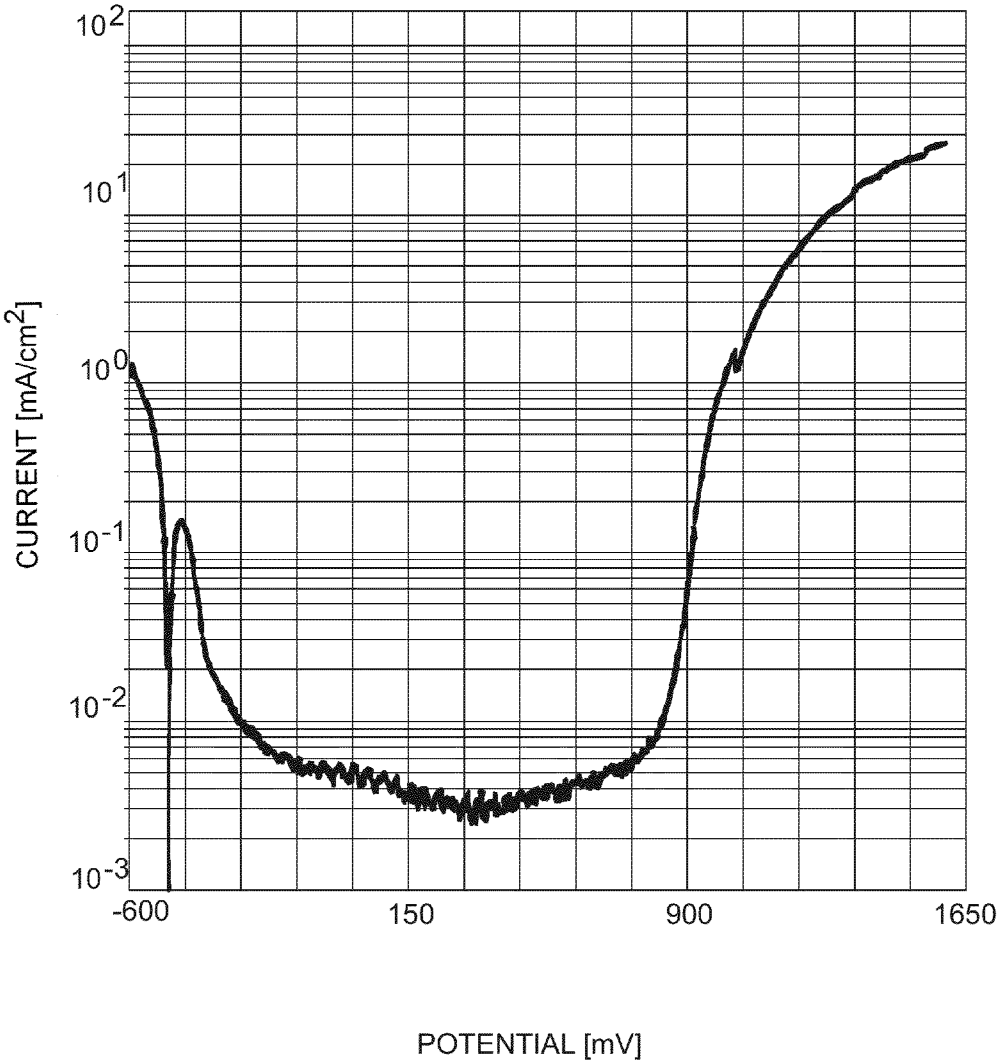
Figure 7B:
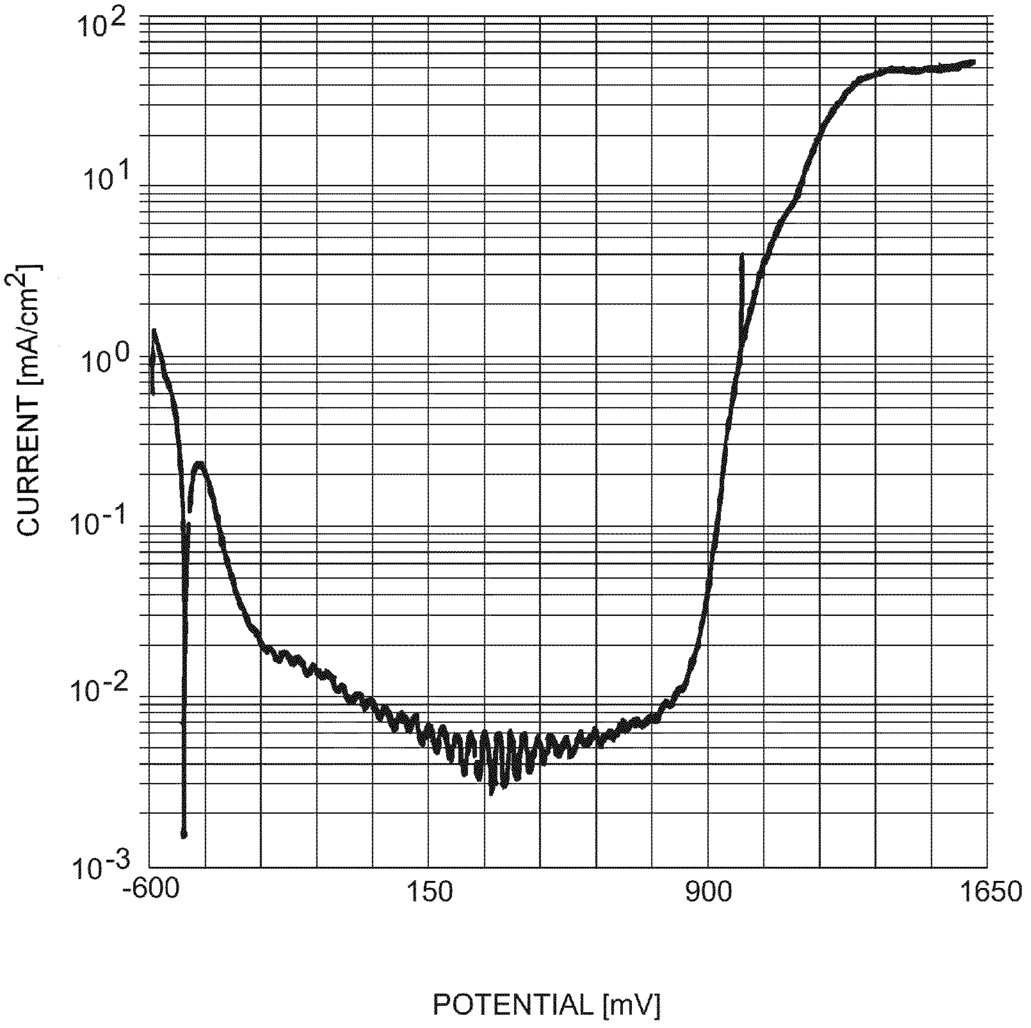
Figure 8:
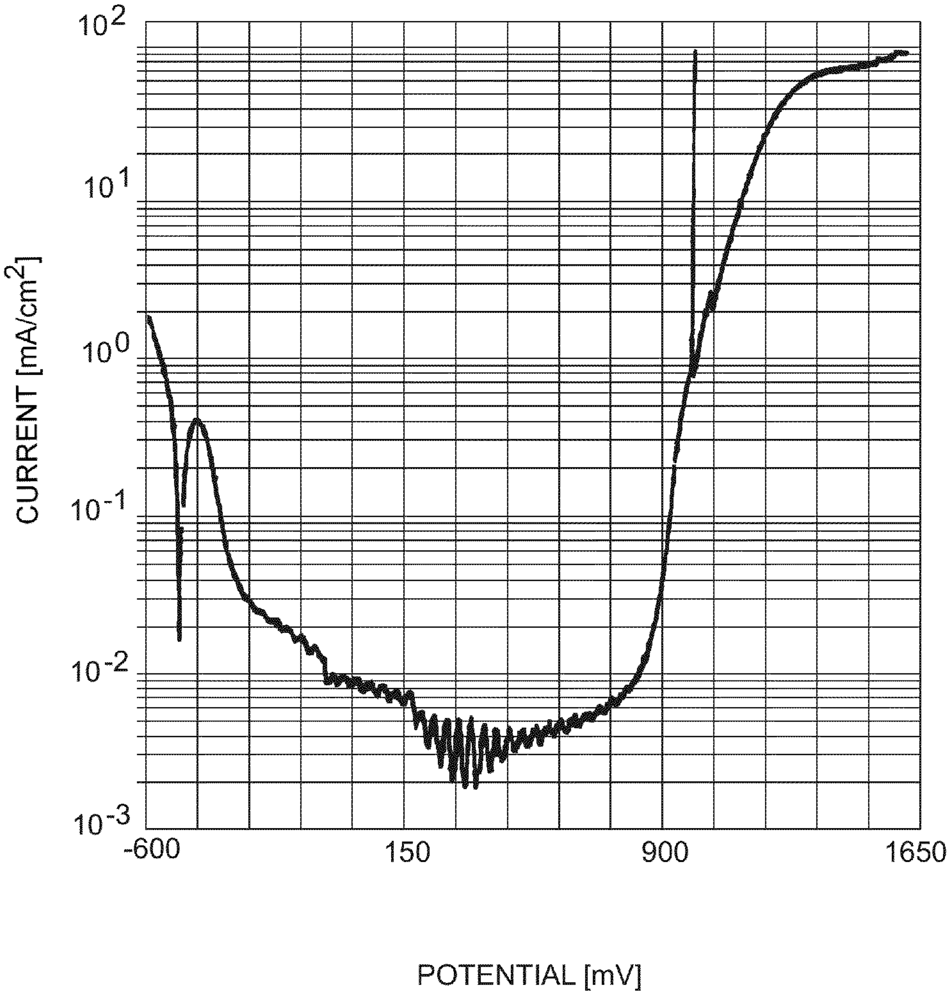

The resistance of the steel according to the invention against general corrosion, was compared with a number of commercial reference materials, by registering polarisations graphs in 0.05M $H_2SO_4$ at pH 1.2, thus forming a picture of the general corrosion resistance, e.g. for condensate water in a form cavity, see FIGS. 3-8, where:

FIG. 3 shows a polarisation graph for the reference steel no. 3, $T_A$ of 1080° C./30 min+$T_{temp}$.200° C./2×2 h, FIG. 4*a* shows a polarisation graph for the reference steel no. 4, $T_A$=1080° C./30 min+$T_{temp.}$=200° C./2×2 h, FIG. 4*b* shows a polarisation graph for the reference steel no. 4, $T_A$=1080° C./30 min+$T_{temp.}$=500° C./2×2 h, FIG. 5 shows a polarisation graph for steel no. 5 according to the invention, $T_A$=1050° C./30 min+$T_{temp.}$=200° C./2×2 h, FIG. 6 shows a polarisation graph for steel no. 6 according to the invention, $T_A$=1050° C./30 min+$T_{temp.}$=200° C./2×2 h, FIG. 7*a* shows a polarisation graph for steel no. 7 according to the invention, $T_A$=1100° C./30 min+$T_{temp.}$=200° C./2×2 h, FIG. 7*b* shows a polarisation graph for steel no. 7 according to the invention, $T_A$=1100° C./30 min+$T_{temp.}$=500° C./2×2 h, and FIG. 8 shows a polarisation graph for steel no. 8 according to the invention, $T_A$=1050° C./30 min+$T_{temp.}$=200° C./2×2 h.

From the testing it is clear that the steel according to the invention has the best properties, superior to the commercial reference materials no. 3 and 4, which is indicated in the figures by the polarisation graphs for the steels according to the invention having a deeper and wider U-shape. In particular, the steels according to the invention have a very good resistance against general corrosion also at low potentials, −150 mV and below. The material according to the invention has surprisingly good continued corrosion properties even after high temperature tempering, see FIGS. 7*a* and 7*b*. For a comparison it is referred to reference steel no. 4, the corrosion properties of which are impaired when the material is subjected to high temperature tempering instead of low temperature tempering, see FIGS. 4*a* and 4*b*.

Evaluation of Resistance Against Local Corrosion, CPT

Both test methods show that the steels according to the invention have the same or better resistance to pitting as compared to steel no. 2 that is commercially used today and that can be considered to have a very good resistance against pitting.

Testing in Salt-Fog

The corrosion resistance of the steel according to the invention was compared with some reference steels by testing in salt-fog.

SD1 is testing in salt-fog in 5% NaCl, pH=3.1, 20° C. (5 min salt-fog/55 min rest) during 5 h, gamut 0-100, where 0=no attack, 100=the entire surface corroded. Steels that were not attacked in this environment were tested for a longer time in test SD2.

SD2 is testing in salt-fog of samples that were not attacked in SD1, in 3% NaCl, pH=1.5, 20° C. (5 min salt-fog/55 min rest) during 7 h, gamut 0-100, where 0=no attack, 100=the entire surface corroded.

Before testing in salt-fog, the steels were heat treated according to Table 9 below.

TABLE 9

Heat treatment before testing in salt-fog

| FIG. | Steel | Heat treatment |
|---|---|---|
| 2a | 2 | 1020/30 + 250/2 × 2 |
| 2b | 4 | 1080/30 + 200/2 × 2 |
| 2c | 6 | 1000/30 + 200/2 × 2 |
| 2d | 7 | 1100/30 + 200/2 × 2 |

TABLE 9-continued

| Heat treatment before testing in salt-fog | | |
|---|---|---|
| FIG. | Steel | Heat treatment |
| 2e | 7 | 1100/30 + DF + 200/2 × 2 |
| 2f | 7 | 1100/30 + DF + 500/2 × 2 |

FIGS. 2a-2f show photographs of the tested steels after the testing. The steel according to the invention is well comparable with the commercial reference material no. 2, while reference material no. 4 does not fulfill the demands on corrosion resistance. All steels according to the invention exhibited very good corrosion resistances in salt-fog, even in case of high temperature tempering (steel no. 7, FIG. 2f). The results also show that even without deep freezing and at a higher content of residual austenite, alloy no. 7 has the same corrosion resistance as after deep freezing that has been performed with the object of reducing the content of residual austenite, thereby increasing hardness to at least 60 HRC. It is further shown that also alloy no. 5 reaches the same corrosion resistance in this test. Alloys no. 6 and 8 have good corrosion resistances, but not as high as alloy no. 7.

Evaluation of Resistance to Polarisation in 0.1M HCl

Figure 9:
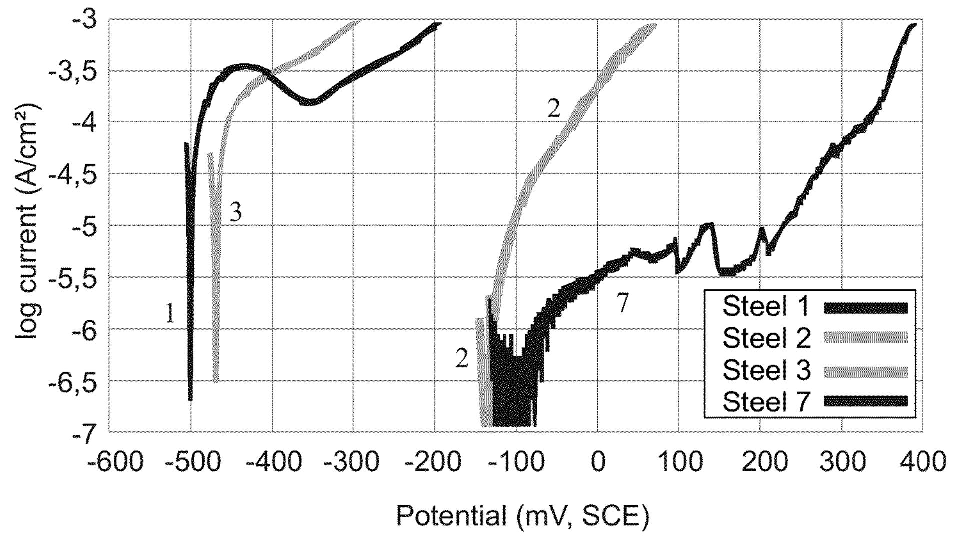
FIG. 9 shows polarisation graphs in 0.1 M HCl.

The corrosion resistance of the steel according to the invention was compared with some reference steels by registering of polarisation graphs in acidic chloride solution, 0.1 M HCl, 3500 ppm chloride, by a method based on ASTM G5. The steels according to the invention had the best corrosion properties. It is particularly interesting that steel no. 7 according to the invention exhibited a passive interval in the registering of polarisation graphs in acidic chlorine solution, which is clear from FIG. 9, and that the rate of corrosion of the steel according to the invention is superior to all reference materials, which is clear from Table 10 below. Also polarisation graphs in $H_2SO_4$ that describe a more general corrosion resistance, e.g. for condensate water in a form cavity, show that alloy no. 7 has the best properties, as described above.

TABLE 10

| Resistance to polarisation for tool steels in 0.1M HCl, 20° C. | |
|---|---|
| Steel no. | Rate of corrosion (μm/year) |
| 1 | 566 |
| 1 | 561 |
| 2 | 10.8 |
| 2 | 10.3 |
| 3 | 430 |
| 3 | 408 |
| 7 | 0.4 |
| 7 | 0.4 |

To sum up the corrosion testing of the materials, it can be said that by the above described electrochemical methods it was possible to rank the corrosion properties of the tool steels. Two groups of tool steels appeared from the two corrosion methods, of which the steels according to the invention and reference steel no. 2 exhibited the best corrosion properties.

Testing of Adhesive Wear

Figure 10:
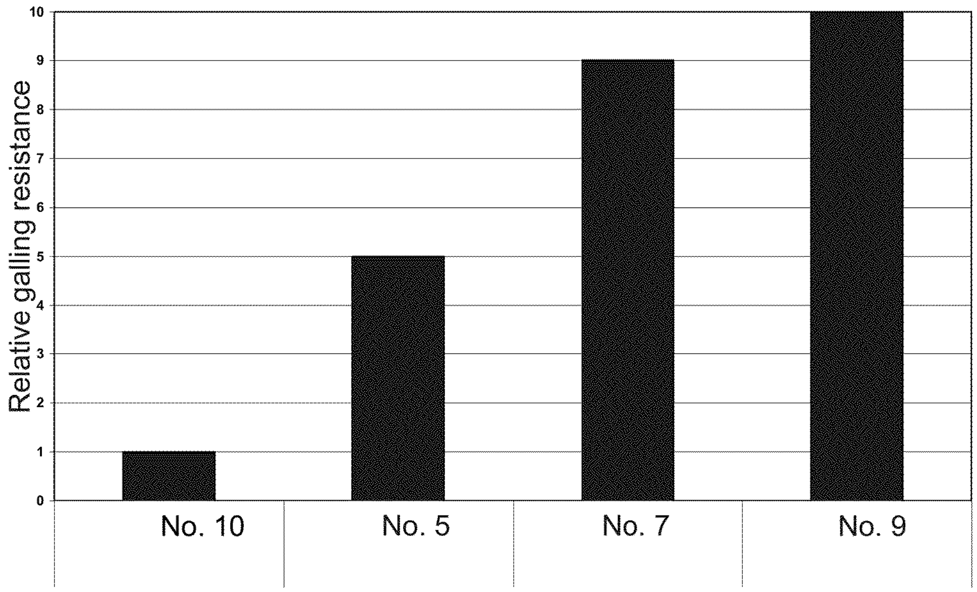
FIG. 10 shows a table over galling resistance.

The resistance of the steel according to the invention, against adhesive wear and galling, was compared with some reference materials by dry testing of the materials against a rotating rod of 18-8 steel, speed of rotation=0.1 m/min, surface roughness ($R_A$)=0.1 μm. Reference steel no. 10 had been hardened from an austenitizing temperature of 1020° C. and tempered at 200° C., and achieved a hardness of 60 HRC. Reference steel no. 9 had been hardened from an austenitizing temperature of 1020° C. and tempered at 560° C./3×1 h, and achieved a hardness of 61 HRC. Steel no. 5 according to the invention had been hardened from an austenitizing temperature of 1100° C. and tempered at 200° C./2×2 h, and achieved a hardness of 50 HRC, while steel no. 7 according to the invention had been hardened from an austenitizing temperature of 1100° C. and tempered at 200° C./2×2 h, and achieved a hardness of 61 HRC. The results from the testing are shown in the graph in FIG. 10, in which:

1=the worst resistance to galling and adhesive wear, and

10=the best resistance to galling and adhesive wear.

It is clear from the diagram that the steel according to the invention has a very good resistance against adhesive wear and galling, particularly steel no. 7 according to the invention, which is comparable with reference material no. 9.

Microstructure

Structure investigations of the tested materials showed that independent of heat treatment, the steel according to the invention contained an even distribution of small carbides that in some cases had coalesced into larger aggregates. The size of these hard phase particles in the final, heat treated product may accordingly exceed 3 μm. Expressed in % by volume, the major part is in the range of 1-10 μm, as measured in the longest extension of the particles. Compared with the reference materials, the microstructure of the materials according to the invention has considerably smaller carbides.

Figure 11:
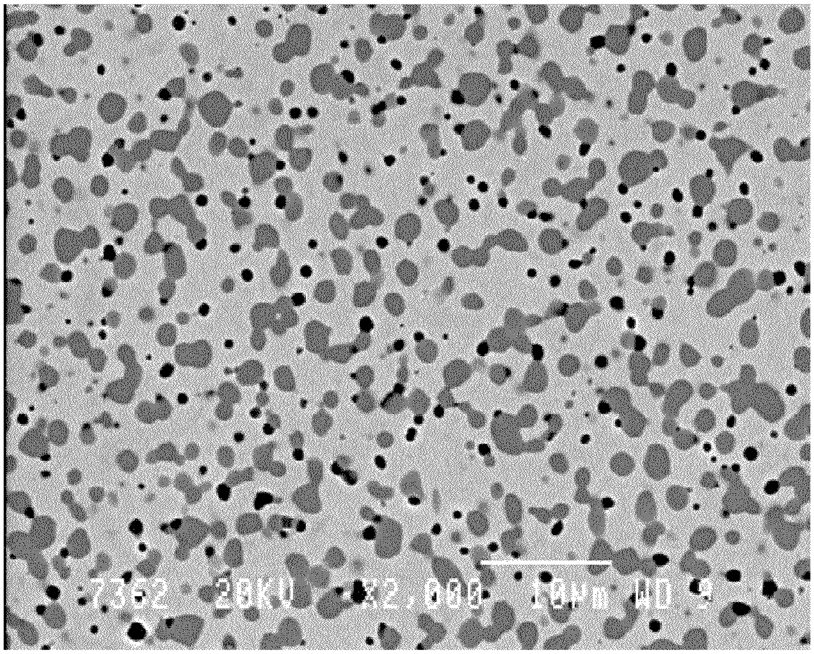
FIG. 11 shows the microstructure of steel no. 4 (reference steel)

FIG. 11 shows the microstructure of reference steel no. 4. The steel is hardened from an austenitizing temperature of 1080° C./30 min and tempered at a tempering temperature of 200° C./2×2 h. The content of carbides was determined by counting of spots. In the figure, chromium carbides ($M_2X$) appear to be grey and exist at 24% by volume, while vanadium carbides (MX) are black and exist at 4.5% by volume, in total 28.5% by volume.

Figure 12:
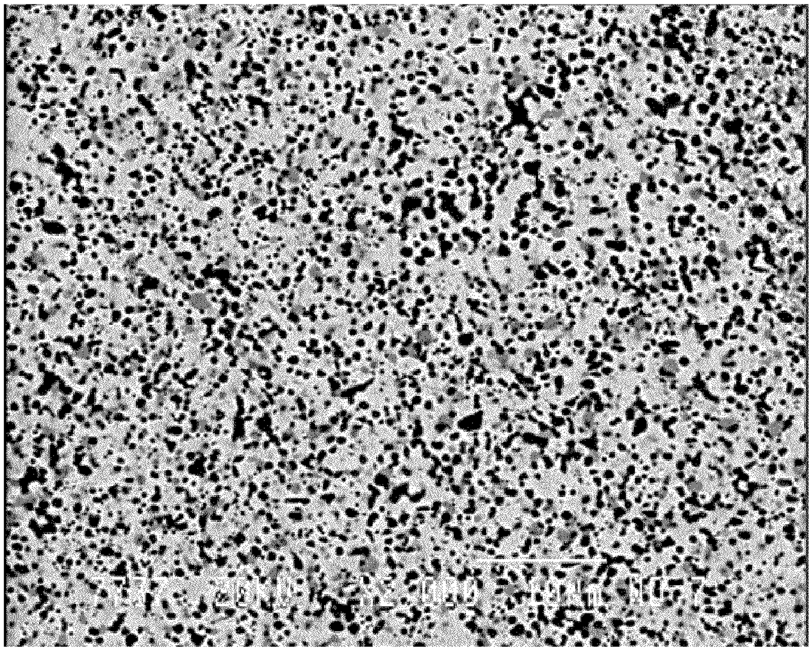
FIG. 12 shows the microstructure of steel no. 6 according to the invention.

FIG. 12 shows the microstructure of steel no. 6 according to the invention. The steel is hardened from an austenitizing temperature of 1050° C./30 min and tempered at a tempering temperature of 200° C./2×2 h. In the figure, chromium carbides ($M_2X$) appear to be grey and exist at 3% by volume, while vanadium carbides (MX) are black and exist at 17.5% by volume, in total 20% by volume.

Hardness after Heat Treatment

Figure 13:
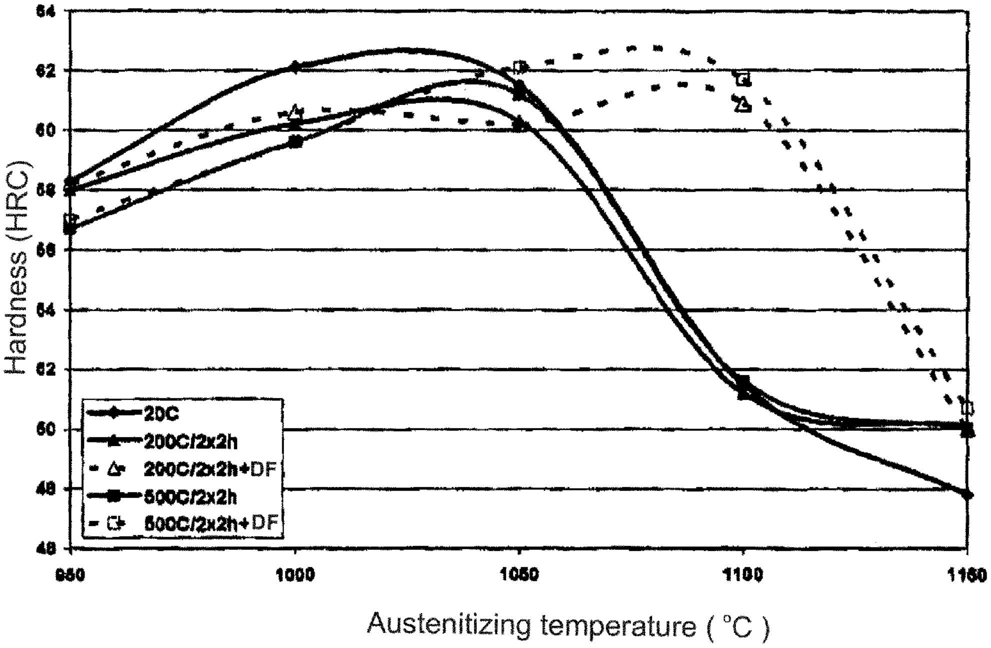
FIG. 13 shows hardness depending on austenitizing temperature for steel no. 6 according to the invention.
Figure 14:
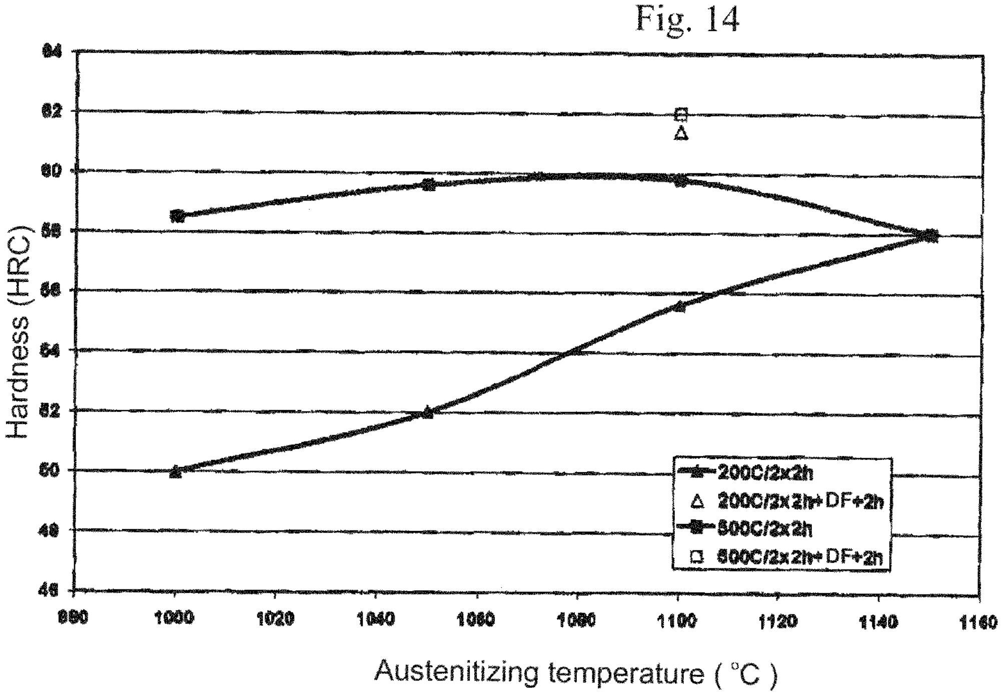
FIG. 14 shows hardness depending on austenitizing temperature for steel no. 7 according to the invention.

The hardness after austenitizing between 1000-1100° C./30 min+tempering 2×2 h at 200 and 500° C., respectively, was measured for the tested materials, and is shown in Table 10. Reference material no. 3 achieved a hardness of 58 HRC after low temperature tempering, and 59.5 HRC after high temperature tempering. Reference material no. 4 achieved a hardness of 61 HRC in both low temperature and high temperature annealing. The steels according to the invention exhibited hardnesses in the range of 55 to 62 HRC. FIG. 13 shows a diagram over the hardness of steel no. 6 depending on austenitizing temperature. It is also clear that a reduction of the contents of residual austenite in the material, by deep freezing the material in liquid nitrogen at −196° C., enables an increased austenitizing temperature, whereby the content of chromium can be increased in the matrix, resulting in improved corrosion resistance. FIG. 14 shows a diagram over the hardness of steel no. 7 depending on austenitizing temperature. It is also clear there from that the steel can reach 60-62 HRC by deep freezing. Both steels no. 6 and no. 7 according to the invention showed a potential of reaching 61-62 HRC after heat treatment by austenitizing at 1050-1100° C./30 min+tempering at 500° C./2×2 h.

Contents of Residual Austenite

The contents of residual austenite after heat treatment are also shown in Table 10, for the steel materials that were investigated. It is clear from the table that the contents of residual austenite can be reduced by deep freezing. The contents of residual austenite were measured by X-ray diffraction.

TABLE 10

Residual austenite after heat treatment

| Steel material | Heat treatment $T_A$ (° C.)/time (min) + $T_{temp.}$ (° C.)/time (h) | Content of residual austenit (% by vol.) | Hardness (HRC) |
|---|---|---|---|
| 3 | 1080/30 + 200/2 × 2 | <3 | 58 |
| 3 | 1080/30 + 500/2 × 2 | <3 | 59.5 |
| 4 | 1080/30 + 200/2 × 2 | <3 | 61 |
| 4 | 1080/30 + 500/2 × 2 | <3 | 61 |
| 5 | 1000/30 + 200/2 × 2 | <3 | 58 |
| 5 | 1000/30 + 500/2 × 2 | <3 | 55 |
| 5 | 1050/30 + 200/2 × 2 | <=10 | 60 |
| 5 | 1050/30 + 500/2 × 2 | <=10 | 59.5 |
| 6 | 1000/30 + 200/2 × 2 | <5 | 60 |
| 6 | 1000/30 + 500/2 × 2 | <5 | 59.5 |
| 6 | 1050/30 + 200/2 × 2 | <=20 | 60 |
| 6 | 1050/30 + 500/2 × 2 | <=20 | 61 |
| 7 | 1100/30 + 200/2 × 2 | 50 | 55.5 |
| 7 | 1100/30 + 500/2 × 2 | 50 | 59.5 |
| 7 | 1100/30 + DF + 200/2 × 2 | 10 | 61 |
| 7 | 1100/30 + DF + 500/2 × 2 | 5 | 62 |
| 8 | 1050/30 + 200/2 × 2 | <5 | 59.5 |
| 8 | 1050/30 + 500/2 × 2 | <5 | 60 |

DF = deep freezing in liquid nitrogen, −196° C.

What is claimed is:

1. A powder metallurgically manufactured martensitic steel consisting of, in % by weight:

0.13-0.8 C
≦1.0 Si
0.2-2.0 Mn
18-30 Cr
≦3.0 Ni
0.01-3.5 Mo
0.01-4.0 (Mo+W/2)
≦5.0 Co
≦0.5 S
1.7-6.5 N
≦7.0 (Ti+Zr+Al)
2.0-11.0 V
≦2.0 Nb
2.0-11.0 (V+Nb/2), balance of iron and impurities at normal amounts, wherein N and (V+Nb/2) are balanced in relation to each other such that contents of these elements are within an area defined by the coordinates J, E, E''', J''', J in the system of coordinates in FIG. 1, where the coordinates of [N, (V+Nb/2)] for J, E, E''', J''', and J are:

J: [1.1, 1.5]
E: [1.9, 1.5]
E''': [6.5, 11.0]
J''': [3.5, 11.0], wherein the steel, at an austenitizing temperature ($T_A$), has a calculated PRE of 19.8-31.1, wherein PRE=Cr+3.3 Mo+20 N and Cr, Mo, and N are the calculated equilibrium contents dissolved in the matrix at $T_A$, wherein the chromium content dissolved in the austenite is at least 16 wt.-%, wherein the total content of MX, $M_2X$, $M_{23}C_6$, and $M_7C_3$ does not exceed 50 vol.-%, wherein M is a metal and X is at least one of carbon and nitrogen, and wherein the content of carbides, nitrides, and/or carbonitrides are, in % by volume:

5-40 MX
≦10 $M_2$×
≦10 $M_{23}C_6$+$M_7C_3$.

2. A steel material according to claim 1, wherein N and (V+Nb/2) are balanced in relation to each other such that the contents of these elements are within an area that is defined by the coordinates E', E'', J'', J', E' in the system of coordinates in FIG. 1, where the coordinates of [N, (V+Nb/2)] for E', E'', J' and J'' are:

E': [3.1, 4.0]
E'': [4.8, 7.5]
J': [1.7, 4.0] and
J'': [2.6, 7.5].

3. A steel material according to claim 1, wherein N and (V+Nb/2) are balanced in relation to each other such that the contents of these elements are within an area that is defined by the coordinates E, E', J', J, E in the system of coordinates in FIG. 1, where the coordinates of [N, (V+Nb/2)] for E, E', J and J' are:

E: [1.9, 1.5]
E': [3.1, 4.0]
J: [1.1, 1.5] and
J': [1.7, 4.0].

4. A steel material according to claim 1, consisting of max 27 Cr.

5. A steel material according to claim 1, consisting of 0.01-3 Ni.

6. A steel material according to claim 1, manufactured via a nitrogen gas atomization of a steel melt.

7. A steel material according claim 1, manufactured via a production of powder by gas atomization of a steel melt and solid phase nitration of the powder.

8. A tool for injection molding, compression molding and extrusion of plastic components manufactured out of a steel material according to claim 1.

9. A tool for the pressing of a powder manufactured out of a steel material according to claim 1.

10. A tool for the forming and cutting of sheets within cold working applications manufactured out of a steel material according to claim 1.

11. Construction components injection nozzles for at least one selected from the group consisting of engines, wear parts, pump parts, and bearing components manufactured out of a steel material according to claim 1.

12. Implements for use within food industry manufactured out of a steel material according to claim 1.

13. A steel material according to claim 1, wherein the hardness is between 45-62 HRC.

14. A steel material according to claim 13, wherein the hardness is between 55-62 HRC.

15. A steel material according to claim 14, wherein the hardness is between 60-62 HRC.

16. A steel material according to claim 1, wherein the corrosion resistance in hardened and tempered condition is defined by the resistance to polarization in 0.05 M $H_2SO_4$ at pH 1.2 at a potential of between −300 mV and 150 mV, wherein the current at said potential is less than $10^{-1}$ mA/cm$^2$.

17. A steel material according to claim 16, wherein the steel is hardened by austenitizing at a temperature ($T_A$) of 1050-1150° C./30 min, cooled to a temperature between −40° C. and −196° C., and tempered twice at a temperature of 200 to <400° C.

18. A steel material according to claim 17, wherein the steel is hardened by austenitizing at a temperature ($T_A$) of 1050-1120° C./30 min, cooled to a temperature between −40° C. and −196° C., and tempered twice at a temperature of 200° C.

19. A steel material according to claim 1, wherein the corrosion resistance in hardened and tempered condition is defined by the resistance to polarization in 0.05 M $H_2SO_4$ at pH 1.2 at a potential of between 0 mV and 150 mV, wherein the current at said potential is less than $10^{-2}$ mA/cm$^2$.

20. A steel material according to claim 19, wherein the steel is hardened by austenitizing at a temperature ($T_A$) of 1050-1150° C./30 min, cooled to a temperature between −40° C. and −196° C., and tempered twice at a temperature of 200 to <400° C.

21. A steel material according to claim 20, wherein the steel is hardened by austenitizing at a temperature ($T_A$) of 1050-1100° C./30 min, cooled to a temperature between −40° C. and −196° C., and tempered twice at a temperature of 200° C.

22. A powder metallurgically manufactured martensitic steel consisting of, in % by weight:

0.13-0.8 C
≦1.0 Si
0.2-2.0 Mn
18-30 Cr
≦3.0 Ni
0.01-3.5 Mo
0.01-4.0 (Mo+W/2)
≦5.0 Co
≦0.5 S
1.7-6.5 N
≦7.0 (Ti+Zr+Al)
8.5-11.0 V
≦2.0 Nb
7.5-11.0 (V+Nb/2),
balance of iron and impurities at normal amounts, wherein N and (V+Nb/2) are balanced in relation to each other such that the contents of these elements are within an area that is defined by the coordinates J", J'", I'", I", J" in the system of coordinates in FIG. 1, where the coordinates of [N, (V+Nb/2)] for I", I'", J" and J'" are:

I": [1.6, 7.5]
I'": [2.1, 11.0]
J": [2.6, 7.5] and
J'": [3.5, 11.0]

wherein the steel, at an austenitizing temperature ($T_A$), has a calculated PRE of 19.8-31.1, wherein PRE=Cr+3.3 Mo+20 N and Cr, Mo, and N are the calculated equilibrium contents dissolved in the matrix at $T_A$, wherein the chromium content dissolved in the austenite is at least 16 wt.-%, wherein the total content of MX, $M_2X$, $M_{23}C_6$, and $M_7C_3$ does not exceed 50 vol.-%, wherein M is a metal and X is at least one of carbon and nitrogen, and wherein the content of carbides, nitrides, and/or carbonitrides are, in % by volume:

5-40 MX
≦10 $M_2X$
≦10 $M_{23}C_6$+$M_7C_3$.

23. A steel material according to claim 22, consisting of max 27 Cr.

24. A steel material according to claim 22, consisting of 0.01-3 Ni.

25. A steel material according to claim 22, manufactured via a nitrogen gas atomization of a steel melt.

26. A steel material according claim 22, manufactured via a production of powder by gas atomization of a steel melt and solid phase nitration of the powder.

27. A tool for injection molding, compression molding and extrusion of plastic components manufactured out of a steel material according to claim 22.

28. A tool for the pressing of a powder manufactured out of a steel material according to claim 22.

29. A tool for the forming and cutting of sheets within cold working applications manufactured out of a steel material according to claim 22.

30. Construction components injection nozzles for at least one selected from the group consisting of engines, wear parts, pump parts, and bearing components manufactured out of a steel material according to claim 22.

31. Implements for use within food industry manufactured out of a steel material according to claim 22.

32. A steel material according to claim 22, wherein the hardness is between 45-62 HRC.

33. A steel material according to claim 32, wherein the hardness is between 55-62 HRC.

34. A steel material according to claim 33, wherein the hardness is between 60-62 HRC.

35. A steel material according to claim 22, wherein the corrosion resistance in hardened and tempered condition is defined by the resistance to polarization in 0.05 M $H_2SO_4$ at pH 1.2 at a potential of between −300 mV and 150 mV, wherein the current at said potential is less than $10^{-1}$ mA/cm$^2$.

36. A steel material according to claim 35, wherein the steel is hardened by austenitizing at a temperature ($T_A$) of 1050-1150° C./30 min, cooled to a temperature between −40° C. and −196° C., and tempered twice at a temperature of 200 to <400° C.

37. A steel material according to claim 36, wherein the steel is hardened by austenitizing at a temperature ($T_A$) of 1050-1120° C./30 min, cooled to a temperature between −40° C. and −196° C., and tempered twice at a temperature of 200° C.

38. A steel material according to claim 22, wherein the corrosion resistance in hardened and tempered condition is defined by the resistance to polarization in 0.05 M $H_2SO_4$ at pH 1.2 at a potential of between 0 mV and 150 mV, wherein the current at said potential is less than $10^{-2}$ mA/cm$^2$.

39. A steel material according to claim 38, wherein the steel is hardened by austenitizing at a temperature ($T_A$) of 1050-1150° C./30 min, cooled to a temperature between −40° C. and −196° C., and tempered twice at a temperature of 200 to <400° C.

40. A steel material according to claim 39, wherein the steel is hardened by austenitizing at a temperature ($T_A$) of 1050-1100° C./30 min, cooled to a temperature between −40° C. and −196° C., and tempered twice at a temperature of 200° C.

* * * * *